United States Patent
Takahashi et al.

(10) Patent No.: US 11,184,899 B2
(45) Date of Patent: Nov. 23, 2021

(54) TERMINAL APPARATUS, BASE STATION APPARATUS, COMMUNICATION METHOD, AND INTEGRATED CIRCUIT

(71) Applicants: Sharp Kabushiki Kaisha, Sakai (JP); FG Innovation Company Limited, Tuen Mun (HK)

(72) Inventors: Hiroki Takahashi, Sakai (JP); Shohei Yamada, Sakai (JP); Hidekazu Tsuboi, Sakai (JP); Kazunari Yokomakura, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 23 days.

(21) Appl. No.: 16/620,632

(22) PCT Filed: Jun. 14, 2018

(86) PCT No.: PCT/JP2018/022800
§ 371 (c)(1),
(2) Date: Dec. 9, 2019

(87) PCT Pub. No.: WO2018/230667
PCT Pub. Date: Dec. 20, 2018

(65) Prior Publication Data
US 2021/0144723 A1 May 13, 2021

(30) Foreign Application Priority Data
Jun. 15, 2017 (JP) .............................. JP2017-117490

(51) Int. Cl.
*H04W 72/08* (2009.01)
*H04L 5/00* (2006.01)
(Continued)

(52) U.S. Cl.
CPC ........... *H04W 72/082* (2013.01); *H04L 5/005* (2013.01); *H04W 72/005* (2013.01); *H04W 74/006* (2013.01)

(58) Field of Classification Search
CPC ............. H04W 72/082; H04W 72/005; H04W 74/006; H04L 5/005
See application file for complete search history.

(56) References Cited

U.S. PATENT DOCUMENTS

2013/0301608 A1* 11/2013 Frenne .............. H04W 74/0833
370/331

FOREIGN PATENT DOCUMENTS

WO 2016/025899 A1 2/2016
WO 2016/161408 A1 10/2016

OTHER PUBLICATIONS

LG Electronics, "Discussion on SS block, SS burst set composition and time index indication", 3GPP TSG RAN WG1 Meeting #88bis, R1-1704862, Apr. 3-7, 2017, 8 pages.
(Continued)

*Primary Examiner* — Thai Nguyen
(74) *Attorney, Agent, or Firm* — Keating & Bennett, LLP

(57) ABSTRACT

A terminal apparatus (1, 1A, 1B) includes: a receiver (10) configured to receive preamble index information on a physical downlink control channel; and a transmitter (10) configured to, in a case where the preamble index information indicates a prescribed value, select a block from one or more blocks to transmit a random access preamble based on the block selected, and in a case where the preamble index information indicates a value other than the prescribed value, transmit the random access preamble corresponding to a preamble index indicated by the preamble index information, wherein the block includes four OFDM symbols to
(Continued)

which at least a synchronization signal and a physical broadcast channel are mapped.

6 Claims, 15 Drawing Sheets

(51) Int. Cl.
*H04W 72/00* (2009.01)
*H04W 74/00* (2009.01)

(56) References Cited

OTHER PUBLICATIONS

Huawei et al., "Analysis of RACH Procedural Steps", 3GPP TSG RAN WG2 Meeting #98, R2-1705192, May 15-19, 2017, 7 pages.

"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.2.1, Mar. 2017, pp. 1-106.
Official Communication issued in International Patent Application No. PCT/JP2018/022800, dated Aug. 7, 2018.
Ericsson, "Overview of NR", TSG-RAN WG1 #84bis, R1-163215, Apr. 11-15, 2016, 2 pages.
Intel Corporation, "Overview of antenna technology for new radio interface", 3GPP TSG-RAN WG1 #84bis, R1-162380, Apr. 11-15, 2016, pp. 1-3.
Nokia et al., "Basic principles for the 5G New Radio access technology", 3GPP TSG-RAN WG1 #84bis, R1-162883, Apr. 11-15, 2016, 6 pages.
NTT Docomo, "Revision of SI: Study on New Radio Access Technology", 3GPP TSG RAN Meeting #72, RP-161214, Jun. 13-16, 2016, 8 pages.

* cited by examiner

| RANDOM ACCESS CONFIGURATION INFORMATION CORRESPONDING TO FIRST SYNCHRONIZATION SIGNAL BLOCK | AVAILABLE PREAMBLE GROUP |
|---|---|
| | AVAILABLE FREQUENCY/TIME RESOURCE SET |
| | OTHER INFORMATION |
| RANDOM ACCESS CONFIGURATION INFORMATION CORRESPONDING TO SECOND SYNCHRONIZATION SIGNAL BLOCK | AVAILABLE PREAMBLE GROUP |
| | AVAILABLE FREQUENCY/TIME RESOURCE SET |
| | OTHER INFORMATION |

FIG. 8

TERMINAL APPARATUS, BASE STATION APPARATUS, COMMUNICATION METHOD, AND INTEGRATED CIRCUIT

TECHNICAL FIELD

One aspect of the present invention relates to a terminal apparatus, a base station apparatus, a communication method, and an integrated circuit.

BACKGROUND ART

Technical studies and standardization of Long Term Evolution (LTE)-Advanced Pro and New Radio (NR) technology, as a radio access scheme and a radio network technology for the fifth generation cellular systems, are currently conducted in the Third Generation Partnership Project (3GPP) (NPL 1).

The fifth generation cellular systems require three anticipated scenarios for services: enhanced Mobile BroadBand (eMBB) that realizes high-speed and high-capacity transmission; Ultra-Reliable and Low Latency Communication (URLLC) that realizes low-latency and high-reliability communication; and massive Machine Type Communication (mMTC) that allows a large number of machine type devices to be connected in a system such as Internet of Things (IoT).

In NR, technical studies of massive Multiple-Input Multiple-Output (MIMO), in which a large number of antenna elements are used in high frequency to secure coverage with a beamforming gain, are conducted (NPL 2, NPL 3, and NPL 4).

CITATION LIST

Non Patent Literature

NPL 1: RP-161214 NTT DOCOMO, "Revision of SI: Study on New Radio Access Technology", June 2016

NPL 2: R1-162883 Nokia, Alcatel-Lucent Shanghai Bell, "Basic Principles for the 5G New Radio Access technology", April, 2016

NPL 3: R1-162380, Intel Corporation, "Overview of antenna technology for new radio interface", April, 2016

NPL 4: R1-163215, Ericsson, "Overview of NR", April, 2016

SUMMARY OF INVENTION

Technical Problem

The present invention provides a terminal apparatus capable of efficiently communicating with a base station apparatus, a base station apparatus communicating with the terminal apparatus, a communication method used for the terminal apparatus, and a communication method used for the base station apparatus. For example, the communication methods used for the terminal apparatus and the base station apparatus may include an uplink transmission method, a modulation method, and/or a coding method for achieving efficient communication, reducing complexity, and reducing interference between cells and/or between terminal apparatuses.

Solution to Problem (1) According to some aspects of the present invention, the following measures are provided. Specifically, a first aspect of the present invention is a terminal apparatus including: a receiver configured to receive preamble index information on a physical downlink control channel; and a transmitter configured to, in a case where the preamble index information indicates a prescribed value, select a block from one or more blocks to transmit a random access preamble based on the block selected, and in a case where the preamble index information indicates a value other than the prescribed value, transmit the random access preamble corresponding to a preamble index indicated by the preamble index information, wherein the block includes four OFDM symbols to which at least a synchronization signal and a physical broadcast channel are mapped.

(2) A second aspect of the present invention is a base station apparatus including: a transmitter configured to transmit preamble index information on a physical downlink control channel; and a receiver configured to, in a case where the preamble index information indicates a prescribed value, receive a random access preamble based on a block selected from one or more blocks by a terminal apparatus, and in a case where the preamble index information indicates a value other than the prescribed value, receive the random access preamble corresponding to a preamble index indicated by the preamble index information, wherein the block includes four OFDM symbols to which at least a synchronization signal and a physical broadcast channel are mapped.

(3) A third aspect of the present invention is a communication method used for a terminal apparatus, the communication method including: receiving preamble index information on a physical downlink control channel; and selecting, in a case where the preamble index information indicates a prescribed value, a block from one or more blocks to transmit a random access preamble based on the block selected, and transmitting, in a case where the preamble index information indicates a value other than the prescribed value, the random access preamble corresponding to a preamble index indicated by the preamble index information, wherein the block includes four OFDM symbols, to which at least a synchronization signal and a physical broadcast channel are mapped.

(4) A fourth aspect of the present invention is a communication method used for a base station apparatus, the communication method including: transmitting preamble index information on a physical downlink control channel; and receiving, in a case where the preamble index information indicates a prescribed value, a random access preamble based on a block selected from one or more blocks by a terminal apparatus, and receiving, in a case where the preamble index information indicates a value other than the prescribed value, the random access preamble corresponding to a preamble index indicated by the preamble index information, wherein the block includes four OFDM symbols to which at least a synchronization signal and a physical broadcast channel are mapped.

(5) A fifth aspect of the present invention is an integrated circuit implemented on a terminal apparatus, the integrated circuit causing the terminal apparatus to perform: receiving preamble index information on a physical downlink control channel; selecting, in a case where the preamble index information indicates a prescribed value, a block from one or more blocks and transmitting a random access preamble based on the block selected, and transmitting, in a case where the preamble index information indicates a value other than the prescribed value, the random access preamble corresponding to a preamble index indicated by the preamble index information, wherein the block includes four OFDM symbols to which at least a synchronization signal and a physical broadcast channel are mapped.

(6) An integrated circuit implemented on a base station apparatus, the integrated circuit causing the base station apparatus to perform: transmitting preamble index information on a physical downlink control channel; receiving, in a case where the preamble index information indicates a prescribed value, a random access preamble based on a block selected from one or more blocks by a terminal apparatus, and receiving, in a case where the preamble index information indicates a value other than the prescribed value, the random access preamble corresponding to a preamble index indicated by the preamble index information, wherein the block includes four OFDM symbols to which at least a synchronization signal and a physical broadcast channel are mapped.

Advantageous Effects of Invention

According to the present invention, a terminal apparatus and a base station apparatus can efficiently communicate with each other and/or reduce complexity.

BRIEF DESCRIPTION OF DRAWINGS

FIG. 8 is a diagram illustrating an example of a configuration of random access configuration information according to the embodiment of the present invention.

DESCRIPTION OF EMBODIMENTS

Embodiments of the present invention will be described below.

LTE (and LTE-Advanced Pro) and NR may be defined as different Radio Access Technologies (RATs). NR may be defined as a technology included in LTE. The present embodiment may be applied to NR, LTE and other RATs. Terms associated with LTE are used in the following description. However, the present invention may also be applied to other technologies using other terms.

Figure 1:
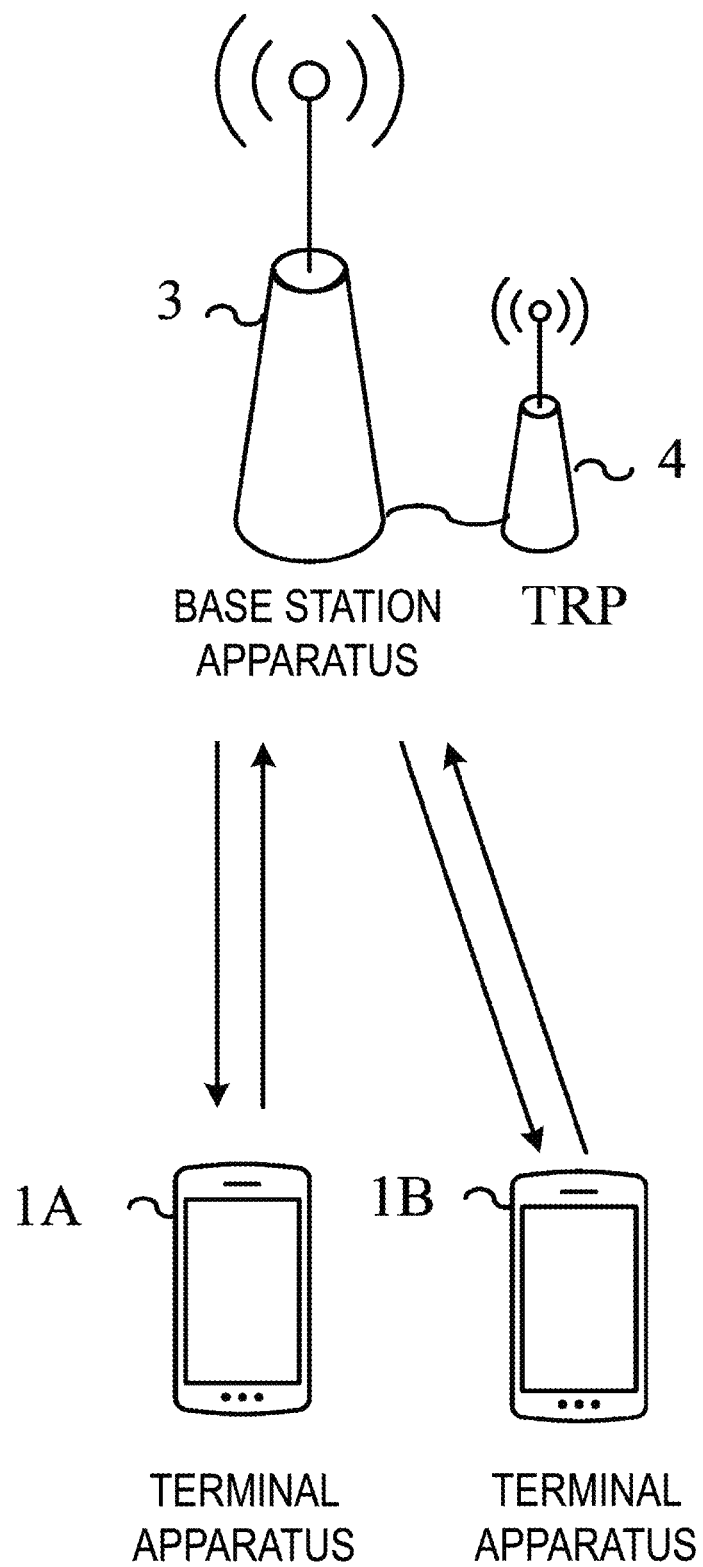
FIG. 1 is a conceptual diagram of a radio communication system according to an embodiment of the present invention.

FIG. 1 is a conceptual diagram of a radio communication system according to an embodiment of the present invention. In FIG. 1, the radio communication system includes a terminal apparatus 1A, a terminal apparatus 1B, and a base station apparatus 3. The terminal apparatus 1A and the terminal apparatus 1B are also referred to as a terminal apparatus 1.

The terminal apparatus 1 may also be referred to as a mobile station apparatus, a User Equipment (UE), a communication terminal, a mobile device, a terminal, a Mobile Station (MS), or the like. The base station apparatus 3 may also be referred to as a radio base station apparatus, a base station, a radio base station, a fixed station, a Node B (NB), an evolved Node B (eNB), an NR Node B (NR NB), a next generation Node B (gNB), an access point, a Base Transceiver Station (BTS), a Base Station (BS), or the like. The base station apparatus 3 may include a core network apparatus. The base station apparatus 3 may include one or more transmission reception points (TRPs) 4. At least a part of functionality/processing of the base station apparatus 3 described below may be functionality/processing of each transmission reception point 4 included in the base station apparatus 3. The base station apparatus 3 may have a communicable range (communication area), controlled by the base station apparatus 3, that includes one or more cells to serve the terminal apparatus 1. The base station apparatus 3 may have a communicable range (communication area), controlled by one or more transmission reception points 4, that includes one or more cells to serve the terminal apparatus 1. One cell may be divided into multiple Beamed areas, and the terminal apparatus 1 may be served in each of the Beamed areas. Here, a beamed area may be identified based on a beam index or a precoding index used for beamforming.

The communication area covered by the base station apparatus 3 may be different in size and shape for each frequency. The covered area may be different for each frequency. A radio network, in which cells having different types of base station apparatuses 3 and different cell radii coexist on the same frequency or different frequencies to form one communication system, is referred to as a heterogeneous network.

A radio communication link from the base station apparatus 3 to the terminal apparatus 1 is referred to as a downlink. A radio communication link from the terminal apparatus 1 to the base station apparatus 3 is referred to as an uplink. A radio communication link from the terminal apparatus 1 to another terminal apparatus 1 is referred to as a sidelink.

In FIG. 1, Orthogonal Frequency Division Multiplexing (OFDM) including Cyclic Prefix (CP), Single-Carrier Frequency Division Multiplexing (SC-FDM), Discrete Fourier Transform Spread OFDM (DFT-S-OFDM), and Multi-Carrier Code Division Multiplexing (MC-CDM) may be employed for radio communication between the terminal apparatus 1 and the base station apparatus 3 and/or the radio communication between the terminal apparatus 1 and another terminal apparatus 1.

In FIG. 1, in the radio communication between the terminal apparatus 1 and the base station apparatus 3 and/or the radio communication between the terminal apparatus 1 and another terminal apparatus 1, Universal-Filtered Multi-Carrier (UFMC), Filtered OFDM (F-OFDM), OFDM in which a window is multiplied (Windowed OFDM), and Filter-Bank Multi-Carrier (FBMC) may be used.

Note that the present embodiment will be described, using OFDM symbols with the assumption that a transmission scheme is OFDM. However, use of any other transmission scheme is also included in the present invention. For example, OFDM symbols in the present embodiment may be SC-FDM symbols (which may also be referred to as Single-Carrier Frequency Division Multiple Access (SC-FDMA) symbols).

In FIG. 1, the aforementioned transmission scheme that uses no CP or uses zero padding instead of the CP may be employed for the radio communication between the terminal apparatus 1 and the base station apparatus 3 and/or the radio communication between the terminal apparatus 1 and another terminal apparatus 1. The CP or zero padding may be added to both of the beginning and the end.

According to the present embodiment, one or more serving cells are configured for the terminal apparatus 1. The multiple configured serving cells include one Primary Cell (also referred to as a PCell) and one or more Secondary Cells (also referred to as SCell(s)). The primary cell is a serving cell in which an initial connection establishment procedure has been performed, a serving cell in which a connection re-establishment procedure has been initiated, or a cell indicated as a primary cell during a handover procedure. One or more secondary cells may be configured at a point of time when or after a Radio Resource Control (RRC) connection is established. Note that the multiple configured serving cells may include one primary secondary cell (also referred to as a Primary SCell or a PSCell). The primary secondary cell may be a secondary cell in which control information can be transmitted in an uplink, out of one or multiple secondary cells in which the terminal apparatus 1 is configured. For the terminal apparatus 1, a subset of two types serving cells, i.e., a Master Cell Group (also referred to as an MCG) and a Secondary Cell Group (also referred to as an SCG), may be configured. The master cell group includes one primary cell and zero or more secondary cells. The secondary cell group includes one primary secondary cell and zero or more secondary cells.

Time Division Duplex (TDD) and/or Frequency Division Duplex (FDD) may be applied to the radio communication system according to the present embodiment. The Time Division Duplex (TDD) scheme or the Frequency Division Duplex (FDD) scheme may be applied to all of the multiple cells. Cells to which the TDD scheme is applied and cells to which the FDD scheme is applied may be aggregated.

A carrier corresponding to a serving cell in the downlink is referred to as a downlink component carrier (or a downlink carrier). A carrier corresponding to a serving cell in the uplink is referred to as an uplink component carrier (or an uplink carrier). A carrier corresponding to a serving cell in the sidelink is referred to as a sidelink component carrier (or a sidelink carrier). The downlink component carrier, the uplink component carrier, and/or the sidelink component carrier are collectively referred to as a component carrier (or a carrier).

Physical channels and physical signals according to the present embodiment will be described. Note that the downlink physical channel and/or the downlink physical signal may be collectively referred to as a downlink signal. The uplink physical channel and/or the uplink physical signal may be collectively referred to as an uplink signal. The downlink physical channel and/or the uplink physical channel may be collectively referred to as a physical channel. The downlink physical signal and/or the uplink physical signal may be collectively referred to as a physical signal.

In FIG. 1, the following downlink physical channels are used for the downlink radio communication between the terminal apparatus 1 and the base station apparatus 3. The downlink physical channels are used to transmit information output from the higher layer.

New Radio Physical Broadcast CHannel (NR-PBCH)
New Radio Physical Downlink Control CHannel (NR-PDCCH)
New Radio Physical Downlink Shared CHannel (NR-PDSCH)

The NR-PBCH is used for the base station apparatus 3 to broadcast an essential information block (Master Information Block: MIB, Essential Information Block: EIB) including essential system information (Essential information) required by the terminal apparatus 1. Here, one or more essential information blocks may be transmitted as essential information message(s). For example, the essential information block may include information indicating a part or all of frame numbers (System Frame Numbers (SFNs)) (for example, information of location in a superframe including multiple frames). For example, a radio frame (10 ms) includes 10 subframes each having 1 ms, and is identified by a frame number. The frame number wraps around to 0 at 1024. In a case where a different essential information block is transmitted for each region within a cell, information for enabling identification of the region (for example, identifier information of a downlink transmit beam for configuring the region) may be included. Here, the identifier information of the downlink transmit beam may be indicated by using a downlink transmit beam (precoding) index. In a case where a different essential information block (essential information message) is transmitted for each region within the cell, information for enabling identification of a time location within the frame (for example, a subframe number in which the essential information block (essential information message) is included) may be included. That is, information for determining each of the subframe numbers in which the respective essential information blocks (essential information messages) using different downlink transmit beam indexes are transmitted may be included. For example, information necessary for connection to the cell and for mobility may be included in the essential information.

In a case of downlink radio communication (radio communication from the base station apparatus 3 to the terminal apparatus 1), the NR-PDCCH is used to transmit Downlink Control Information (DCI). Here, one or more DCI (which may be referred to as DCI format(s)) are defined for transmission of the downlink control information. In other words, a field for the downlink control information is defined as DCI, and is mapped to information bits.

For example, as the DCI, DCI including information indicating a timing for transmitting HARQ-ACK for a scheduled NR-PDSCH (for example, the number of symbols from the last symbol included in the NR-PDSCH to the symbol for transmission of the HARQ-ACK) may be defined.

For example, as the DCI, DCI used for the scheduling of one downlink radio communication NR-PDSCH in one cell (transmission of one downlink transport block) may be defined.

For example, as the DCI, DCI used for the scheduling of one uplink radio communication NR-PUSCH in one cell (transmission of one uplink transport block) may be defined.

Here, the DCI includes information about the scheduling of the NR-PDSCH or the NR-PUSCH. Here, the DCI for the downlink is also referred to as downlink grant or downlink assignment. Here, the DCI for the uplink is also referred to as uplink grant or Uplink assignment.

The NR-PDSCH is used to transmit downlink data (Downlink Shared CHannel (DL-SCH)) from a medium access (Medium Access Control (MAC)). The NR-PDSCH is also used to transmit System Information (SI), a Random Access Response (RAR), and the like.

Here, the base station apparatus 3 and the terminal apparatus 1 exchange (transmit and/or receive) signals with each other in their respective higher layers. For example, the base station apparatus 3 and the terminal apparatus 1 may transmit and/or receive Radio Resource Control (RRC) signaling (also referred to as Radio Resource Control (RRC) message or Radio Resource Control (RRC) information) in a Radio Resource Control (RRC) layer. The base station apparatus 3 and the terminal apparatus 1 may transmit and/or receive a Medium Access Control (MAC) control element in a Medium Access Control (MAC) layer. Here, the RRC signaling and/or the MAC control element is also referred to as higher layer signaling. The higher layer herein means higher layer(s) as seen from the physical layer, and may therefore include one or more of a MAC layer, an RRC layer, an RLC layer, a PDCP layer, and a NAS layer, for example. For example, the higher layer in the processing of a MAC layer may include one or more of an RRC layer, an RLC layer, a PDCP layer, and a NAS layer, for example.

The NR-PDSCH may also be used to transmit the RRC signaling and the MAC control element (Medium Access Control Control Element (MAC CE)). Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, terminal apparatus-specific (UE-specific) information may be transmitted through signaling dedicated to a certain terminal apparatus 1.

In FIG. 1, the following downlink physical signals are used for downlink radio communication. Here, the downlink physical signals are not used to transmit the information output from the higher layers, but are used by the physical layer.

Synchronization signal (SS)
Reference Signal (RS)

The synchronization signal is used for the terminal apparatus 1 to establish synchronization in a frequency domain and a time domain in the downlink. The synchronization signal may include a Primary Synchronization Signal (PSS) and a Secondary Synchronization Signal (SSS). The synchronization signal may be used for the terminal apparatus 1 to identify a Cell Identifier (cell ID). The synchronization signal may also be used to select/identify/determine a downlink transmit beam to be used by the base station apparatus 3 for downlink beamforming, and/or a downlink receive beam to be used by the terminal apparatus 1. In other words, the synchronization signal may be used to allow the terminal apparatus 1 to select/identify/determine the index of the downlink transmit beam applied to the downlink signal by the base station apparatus 3. Note that the synchronization signal, the primary synchronization signal, and the secondary synchronization signal used in NR may be referred to as NR-SS, NR-PSS, and NR-SSS, respectively.

The downlink reference signal (hereinafter also simply referred to as a reference signal in the present embodiment) may be classified into multiple reference signals, based on applications and the like. For example, one or more of the following reference signals may be used for the reference signal.

Demodulation Reference Signal (DMRS)
Channel State Information Reference Signal (CSI-RS)
Phrase Tracking Reference Signal (PTRS)
Mobility Reference Signal (MRS)

The DMRS may be used for channel compensation during demodulation of a received modulated signal. Regarding the DMRS, a DMRS for demodulating the NR-PDSCH, a DMRS for demodulating the NR-PDCCH, and/or a DMRS for demodulating the NR-PBCH may be collectively referred to as a DMRS, or may be individually defined.

The CSI-RS may be used for channel state measurement. The PTRS may be used to track phase according to movement of the terminal or the like. The MRS may be used to measure quality of reception from multiple base station apparatuses for handover.

The reference signal may be defined as a reference signal for compensating for phase noise.

Note that a function of at least a part of the multiple reference signals may be provided in another reference signal.

At least one of the multiple reference signals or another reference signal may be defined as a Cell-specific reference signal (CRS) individually configured for a cell, a Beam-specific reference signal (BRS) for each transmit beam used by the base station apparatus 3 or the transmission reception point 4, and/or a UE-specific reference signal (URS) individually configured for the terminal apparatus 1.

At least one reference signal may be used for a numerology such as a radio parameter or subcarrier spacing, or used for such Fine synchronization that allows FFT window synchronization or the like to be achieved.

At least one reference signal may also be used for Radio Resource Measurement (RRM). At least one reference signal may also be used for beam management.

A synchronization signal may also be used for at least one reference signal.

In FIG. 1, in uplink radio communication between the terminal apparatus 1 and the base station apparatus 3 (radio communication from the terminal apparatus 1 to the base station apparatus 3), the following uplink physical channels are used. The uplink physical channels are used to transmit information output from the higher layer.

New Radio Physical Uplink Control CHannel (NR-PUCCH)
New Radio Physical Uplink Shared CHannel (NR-PUSCH)
New Radio Physical Random Access CHannel (NR-PRACH)

The NR-PUCCH is used to transmit Uplink Control Information (UCI). Here, the uplink control information may include Channel State Information (CSI) used to indicate a downlink channel state. The uplink control information may include Scheduling Request (SR) used to request an UL-SCH resource. The uplink control information may include Hybrid Automatic Repeat request ACKnowledgment (HARQ-ACK). The HARQ-ACK may indicate a HARQ-ACK for downlink data (Transport block, Medium Access Control Protocol Data Unit (MAC PDU), or Downlink-Shared Channel (DL-SCH)).

The NR-PUSCH is used to transmit uplink data (Uplink Shared CHannel (UL-SCH)) from Medium Access Control (MAC). The NR-PUSCH may be used to transmit HARQ-ACK and/or CSI along with the uplink data. The NR-PUSCH may be used to transmit the CSI only or the HARQ-ACK and CSI only. In other words, the NR-PUSCH may be used to transmit the UCI only.

The NR-PUSCH may be used to transmit the RRC signaling and the MAC control element. Here, the NR-PUSCH may be used to transmit UE Capability in the uplink.

Note that the same term (for example, NR-PCCH) and the same channel definition may be used for the NR-PDCCH and the NR-PUCCH. The same term (for example, NR-PSCH) and the same channel definition may be used for the NR-PDSCH and the NR-PUSCH.

In FIG. 1, the following uplink physical signal is used in the uplink radio communication. Here, the uplink physical signal is not used to transmit information output from the higher layers, but is used by the physical layer.

Uplink Reference Signal (UL RS)

According to the present embodiment, the following two types of uplink reference signals are used.

Demodulation Reference Signal (DMRS)

Sounding Reference Signal (SRS)

The base station apparatus 3 uses the DMRS in order to perform channel compensation of the NR-PUSCH or the NR-PUCCH. Transmission of both of the NR-PUSCH and the DMRS is hereinafter referred to simply as transmission of the NR-PUSCH. Transmission of both of the NR-PUCCH and the DMRS is hereinafter referred to simply as transmission of the NR-PUCCH.

The base station apparatus 3 uses the SRS in order to measure an uplink channel state.

The NR-PRACH may be used to transmit a random access preamble. The NR-PRACH may be used to indicate the initial connection establishment procedure, the handover procedure, the connection re-establishment procedure, synchronization (timing adjustment) for uplink transmission, and a request for an NR-PUSCH (UL-SCH) resource.

The subframe will be described below. The subframe in the present embodiment may also be referred to as a resource unit, a radio frame, a time period, a time interval, or the like.

Figure 2:
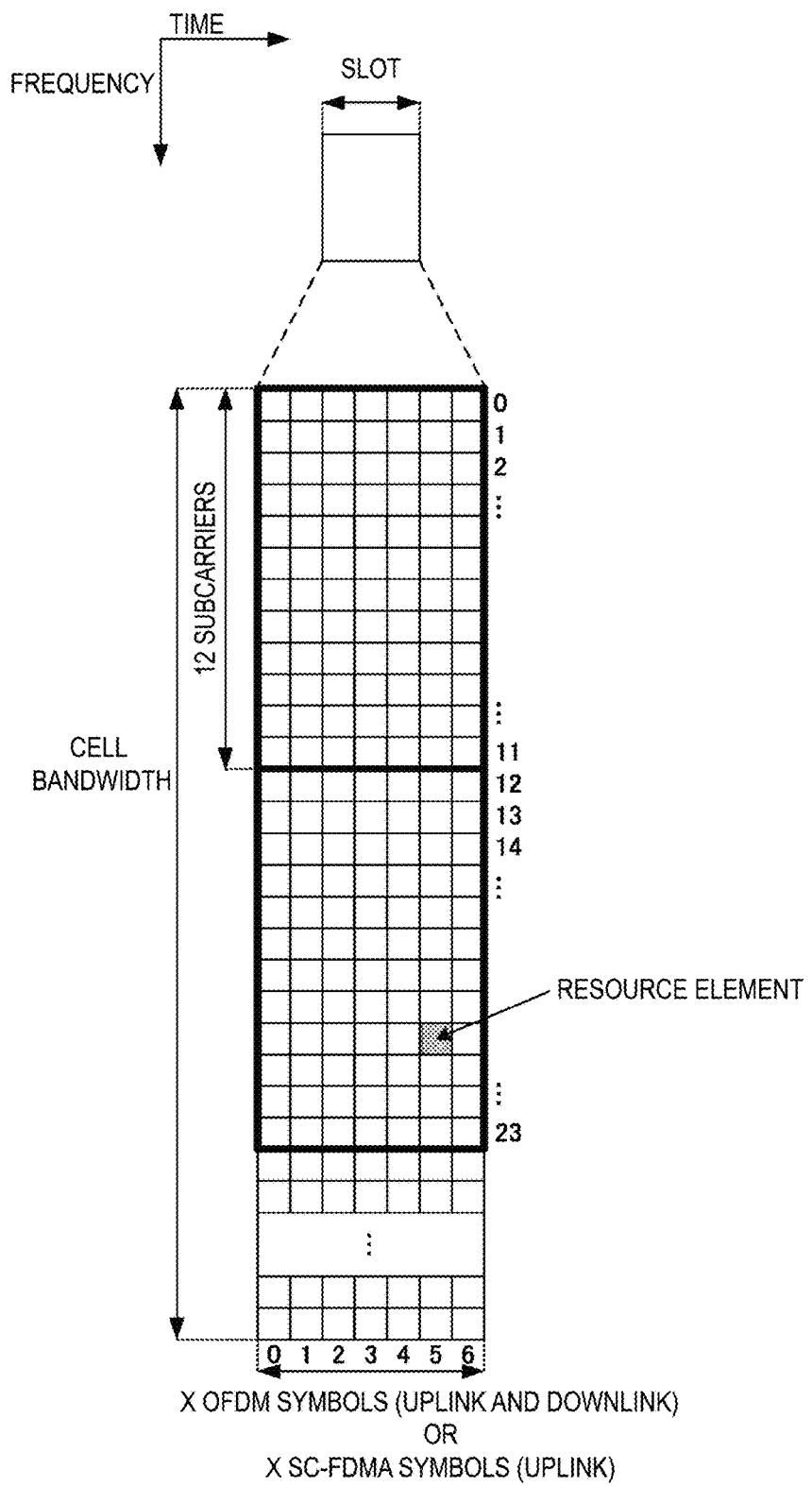
FIG. 2 is a diagram illustrating an example of a schematic configuration of a downlink slot according to the embodiment of the present invention.

FIG. 2 is a diagram illustrating an example of a schematic configuration of a downlink slot according to the embodiment of the present invention. Each of the radio frames is 10 ms in length. Each of the radio frames includes 10 subframes and X slots. In other words, the length of one subframe is 1 ms. For each of the slots, time length is defined based on subcarrier spacings. For example, in a case where the subcarrier spacing of an OFDM symbol is 15 kHz and Normal Cyclic Prefixes (NCPs) are used, X=7 or X=14, and X=7 and X=14 correspond to 0.5 ms and 1 ms, respectively. In a case where the subcarrier spacing is 60 kHz, X=7 or X=14, and X=7 and X=14 correspond to 0.125 ms and 0.25 ms, respectively. FIG. 2 illustrates a case of X=7 as an example. Note that a case of X=14 can be similarly configured by expanding the case of X=7. The uplink slot is defined similarly, and the downlink slot and the uplink slot may be defined separately.

The signal or the physical channel transmitted in each of the slots may be represented by a resource grid. The resource grid is defined by multiple subcarriers and multiple OFDM symbols. The number of subcarriers constituting one slot depends on each of the downlink and uplink bandwidths of a cell. Each element within the resource grid is referred to as a resource element. The resource element may be identified by using a subcarrier number and an OFDM symbol number.

A resource block is used to represent mapping of a certain physical downlink channel (such as the PDSCH) or a certain physical uplink channel (such as the PUSCH) to resource elements. As the resource block, a virtual resource block and a physical resource block are defined. A certain physical uplink channel is first mapped to a virtual resource block. Thereafter, the virtual resource block is mapped to a physical resource block. In a case where the number X of OFDM symbols included in a slot is 7 and NCPs are used, one physical resource block is defined by 7 consecutive OFDM symbols in the time domain and by 12 consecutive subcarriers in the frequency domain. Hence, one physical resource block includes (7×12) resource elements. In a case of Extended CPs (ECPs), one physical resource block is defined, for example, by 6 consecutive OFDM symbols in the time domain and by 12 consecutive subcarriers in the frequency domain. Hence, one physical resource block includes (6×12) resource elements. In this case, one physical resource block corresponds to one slot in the time domain, and corresponds to 180 kHz in the frequency domain. Physical resource blocks are numbered from 0 in the frequency domain.

Figure 3:
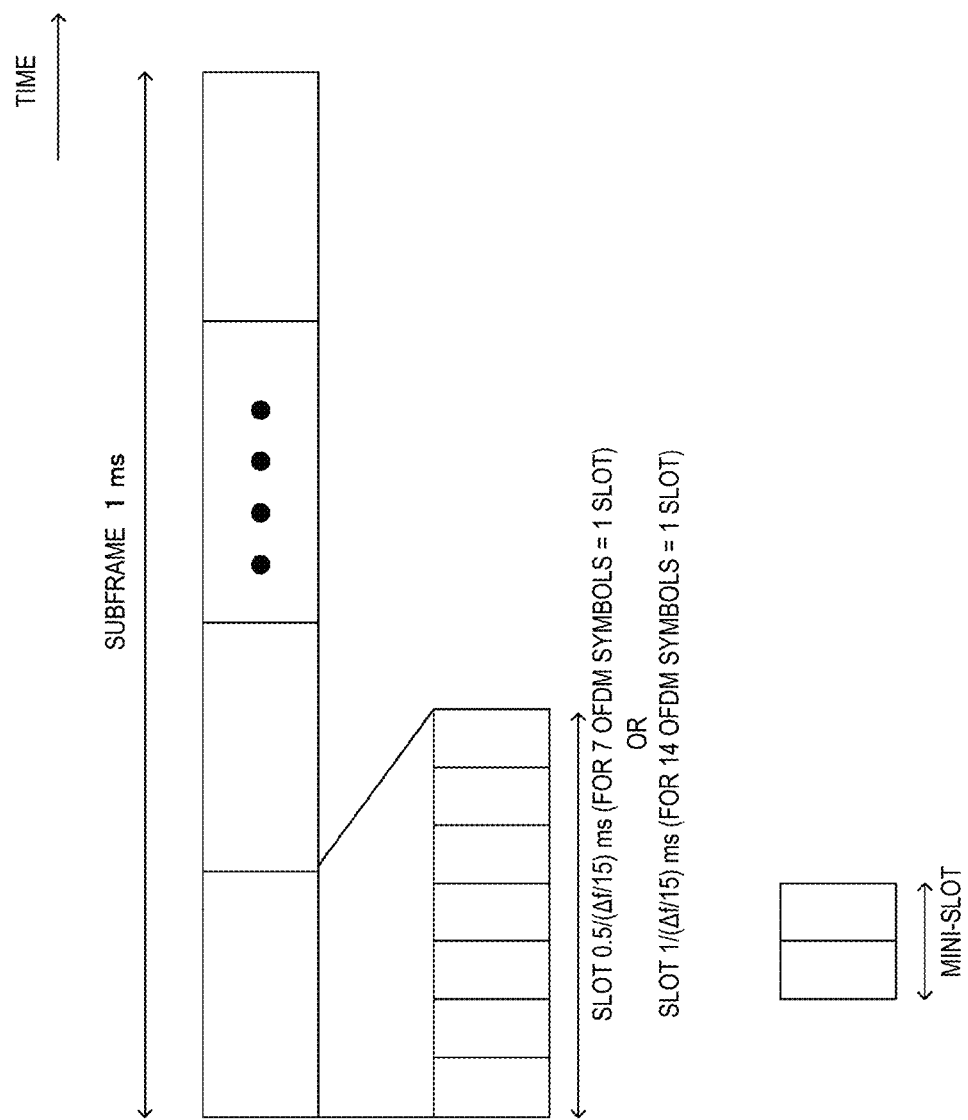
FIG. 3 is a diagram illustrating a relationship in the time domain between a subframe, a slot, and a mini-slot according to the embodiment of the present invention.

Next, a subframe, a slot, and a mini-slot will be described. FIG. 3 is a diagram illustrating the relationship in the time domain between the subframe, the slot, and the mini-slot. As illustrated in FIG. 3, three types of time units are defined. The subframe is 1 ms regardless of the subcarrier spacing. The number of OFDM symbols included in the slot is 7 or 14, and the slot length depends on the subcarrier spacing. Here, in a case where the subcarrier spacing is 15 kHz, 14 OFDM symbols are included in one subframe. Thus, with the assumption that the subcarrier spacing is $\Delta f$ (kHz), the slot length may be defined as $0.5/(\Delta f/15)$ ms in a case where the number of OFDM symbols constituting one slot is 7. Here, $\Delta f$ may be defined by subcarrier spacing (kHz). In a case where the number of OFDM symbols constituting one slot is 7, the slot length may be defined as $1/(\Delta f/15)$ ms. Here, $\Delta f$ may be defined by subcarrier spacing (kHz). Furthermore, the slot length may be defined as $X/14/(\Delta f/15)$ ms, where X is the number of OFDM symbols included in the slot.

The mini-slot (which may be referred to as a sub-slot) is a time unit including OFDM symbols that are less in number than the OFDM symbols included in the slot. FIG. 3 illustrates a case where the mini-slot includes two OFDM symbols as an example. The OFDM symbols in the mini-slot may match the timing for the OFDM symbols constituting the slot. Note that the minimum unit of scheduling may be a slot or a mini-slot.

Figure 4:
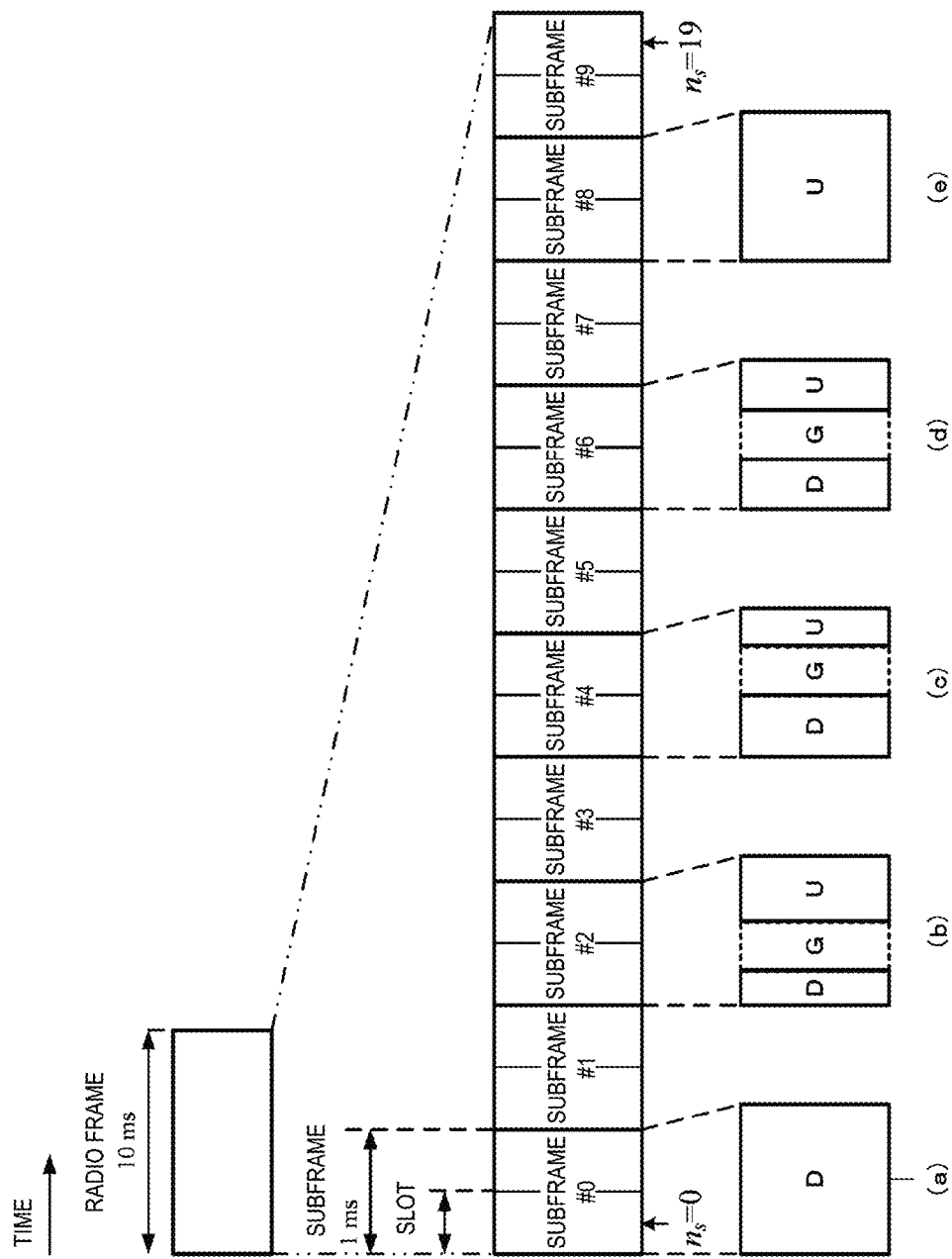
FIG. 4 is a diagram illustrating examples of a slot or a subframe according to the embodiment of the present invention.

FIG. 4 illustrates examples of a slot or a subframe. Here, a case where the slot length is 0.5 ms at a subcarrier spacing of 15 kHz is illustrated as an example. In FIG. 4, D represents the downlink, and U represents the uplink. As illustrated in FIG. 4, during a certain time period (for example, the minimum time period to be allocated to one UE in the system), the subframe may include one or more of the following:

downlink part (duration),
    gap, and
    uplink part (duration).

In a subframe (a) of FIG. 4, the entire subframe is used for downlink transmission during a certain time period (which may be referred to as a minimum unit of a time resource that can be allocated to one UE, or a time unit, for example. Multiple minimum units of a time resource that are bundled may be referred to as a time unit.). In a subframe (b) of FIG. 4, an uplink is scheduled via the NR-PDCCH by using the first time resource, for example, and an uplink signal is transmitted after a gap for a processing delay of the NR-PDCCH, a time for switching from a downlink to an uplink, and generation of a transmit signal. In a subframe (c) of FIG. 4, the downlink NR-PDCCH and/or the downlink NR-PDSCH is transmitted by using the first time resource, and the NR-PUSCH or the NR-PUCCH is transmitted after a gap for a processing delay, a time for switching from a downlink to an uplink, and generation of a transmit signal. Here, as an example, the uplink signal may be used to transmit the HARQ-ACK and/or CSI, namely, the UCI. In a subframe (d) of FIG. 4, the NR-PDCCH and/or the NR-PDSCH is transmitted by using the first time resource, and the NR-PUSCH and/or the NR-PUCCH is transmitted after a gap for a processing delay, a time for switching from a downlink to an uplink, and generation of a transmit signal. Here, as an example, the uplink signal may be used to transmit the uplink data, namely, the UL-SCH. In a subframe (e) of FIG. 4, the entire subframe is used for uplink transmission (NR-PUSCH or NR-PUCCH).

The above-described downlink part and uplink part may include multiple OFDM symbols, similarly to the case with LTE.

Beamforming, beam management, and/or beam sweeping according to the embodiment of the present invention will be described.

Beamforming performed on the transmission side (which is the base station apparatus 3 in the case of a downlink, and the terminal apparatus 1 in the case of an uplink) is a method of controlling, in an analogue or digital manner, the amplitude and the phase of a signal for each of multiple transmit antenna elements to transmit the signal with a high transmit antenna gain in a selected direction, and a field pattern thereof is referred to as a transmit beam. Beamforming performed on the reception side (which is the terminal apparatus 1 in the case of a downlink, and the base station apparatus 3 in the case of an uplink) is a method of controlling, in an analogue or digital manner, the amplitude and the phase of a signal for each of multiple receive antenna elements to receive the signal with a high receive antenna gain in a selected direction, and a field pattern thereof is referred to as a receive beam. Beam management may be operation of the base station apparatus 3 and/or the terminal apparatus 1 for matching directivity of a transmit beam and/or a receive beam, and obtaining a beam gain.

Figure 5:
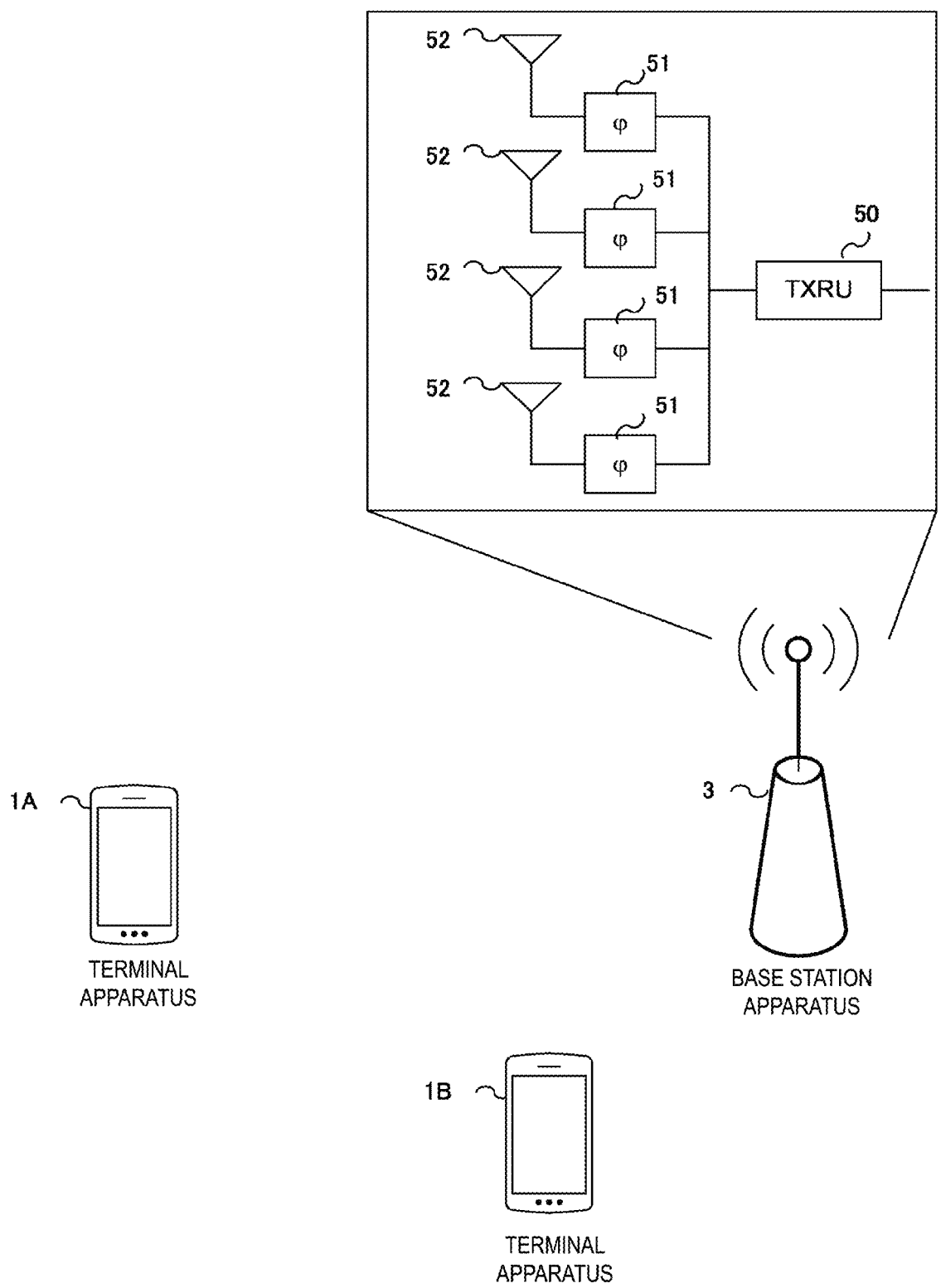
FIG. 5 is a diagram illustrating an example of beamforming according to the embodiment of the present invention.

FIG. 5 illustrates an example of beamforming. Multiple antenna elements are connected to one Transceiver unit (TXRU) 50. The phase is controlled by using a phase shifter 51 for each antenna element and a transmission is performed from an antenna element 52, thus allowing a beam for a transmit signal to be directed in any direction. Typically, the TXRU 50 may be defined as an antenna port, and only the antenna port may be defined for the terminal apparatus 1. Controlling the phase shifter 51 allows setting of directivity in any direction. Thus, the base station apparatus 3 can communicate with the terminal apparatus 1 by using a high gain beam.

The beamforming may be referred to as virtualization, precoding, and multiplication with a weight, for example. Simply, a signal itself transmitted by using beamforming may be referred simply to as a transmit beam.

In the present embodiment, a transmit beam used by the terminal apparatus 1 in uplink transmit beamforming is referred to as an uplink transmit beam (UL Tx beam), and a receive beam used by the base station apparatus 3 in uplink receive beamforming is referred to as an uplink receive beam (UL Rx beam). Note that the uplink transmit beam may be referred to as transmit spatial filter configuration in the terminal apparatus 1, and the uplink receive beam may be referred to as receive spatial filter configuration in the base station apparatus 3. A transmit beam used by the base station apparatus 3 in downlink transmit beamforming is referred to as a downlink transmit beam (DL Tx beam), and a receive beam used by the terminal apparatus 1 in downlink receive beamforming is referred to as a downlink receive beam (DL Rx beam). Note that the downlink transmit beam may be referred to as transmit spatial filter configuration in the base station apparatus 3, and the downlink receive beam may be referred to as receive spatial filter configuration in the terminal apparatus 1. Note that the uplink transmit beam and the uplink receive beam may be collectively referred to as an uplink beam, and the downlink transmit beam and the downlink receive beam may be collectively referred to as a downlink beam. Note that processing performed by the terminal apparatus 1 for uplink beamforming may be referred to as uplink transmit beam processing or uplink precoding, and processing performed by the base station apparatus 3 for uplink beamforming may be referred to as uplink receive beam processing. Note that processing performed by the terminal apparatus 1 for downlink beamforming may be referred to as downlink receive beam processing, and processing performed by the base station apparatus 3 for downlink beamforming may be referred to as downlink transmit beam processing or downlink precoding.

Note that the base station apparatus 3 may transmit a signal by using multiple downlink transmit beams in one OFDM symbol. For example, the antenna element of the base station apparatus 3 may be divided into subarrays to perform downlink beamforming different for each of the subarrays. Downlink beamforming may be performed to be different for each polarization by using a polarization antenna. Similarly, the terminal apparatus 1 may transmit a signal by using multiple uplink transmit beams in one OFDM symbol.

Note that, in the present embodiment, a case where the base station apparatus 3 switches multiple downlink transmit beams to use the multiple downlink transmit beams in a cell served by the base station apparatus 3 and/or the transmission reception point 4 is described. However, an individual cell may be configured for each downlink transmit beam.

The beam management according to the present embodiment may include the following operations.

Beam selection
    Beam refinement
    Beam recovery

For example, the beam selection may be an operation for selecting a beam in communication between the base station apparatus 3 and the terminal apparatus 1. The beam refinement may be an operation for selecting a beam having a higher gain, or changing a beam to an optimum beam between the base station apparatus 3 and the terminal apparatus 1 according to the movement of the terminal apparatus 1. The beam recovery may be an operation for re-selecting a beam in a case where the quality of a communication link is degraded due to blockage caused by a blocking object, a passing of a human being, or the like in communication between the base station apparatus 3 and the terminal apparatus 1. The above operations are not limited to the above purposes. The base station apparatus 3 performs beam management in a variety of conditions, and can therefore exert an effect without limiting the purpose.

For example, a reference signal (for example, CSI-RS) or Quasi Co-Location (QCL) assumption may be used for the terminal apparatus 1 to select the transmit beam for the base station apparatus 3.

In a case where a Long Term Property of a channel on which one symbol in one antenna port is carried may be estimated from a channel on which one symbol in another antenna port is carried, these two antenna ports are said to be quasi co-located (QCL). The long term property of a channel includes one or more of a delay spread, a Doppler spread, a Doppler shift, an average gain, and an average delay. For example, in a case where antenna port 1 and antenna port 2 are quasi co-located (QCL) with respect to the average delay, this means that a reception timing for the antenna port 2 may be estimated from a reception timing for the antenna port 1.

The QCL may also be expanded to beam management. For this purpose, spatially expanded QCL may be newly defined. For example, one or more of the following may be further included in addition to the above, as Long term property of a channel in the spatial QCL assumption.

Angle of Arrival (AoA), Zenith angle of Arrival (ZoA)), or the like in a radio link or a channel, and/or its Angle Spread (for example, Angle Spread of Arrival (ASA) and Zenith angle Spread of Arrival (ZSA))

Transmission angle (AoD, ZoD, or the like) in a radio link or a channel, and/or its Angle Spread (for example, Angle Spread of Departure (ASD) and Zenith angle Spread of Departure (ZSS))

Spatial Correlation

According to this method, operation of the base station apparatus 3 and the terminal apparatus 1 equivalent to beam management may be defined as beam management, based on the spatial QCL assumption and radio resources (time and/or frequency).

Note that an antenna port may be assigned to each of the precoding processes or each of the transmit beams. For example, a signal to be transmitted by using a different precoding process or a signal to be transmitted by using a different transmit beam according to the present embodiment may be defined as a signal to be transmitted through one or more different antenna ports. Note that the antenna port is defined as an antenna port that allows a channel on which a certain symbol is transmitted through a certain antenna port to be inferred from a channel on which another symbol is transmitted through the same antenna port. The same antenna port may also mean that the antenna port number (the number for identifying an antenna port) is the same. Multiple antenna ports may constitute an antenna port set. The same antenna port set may also mean that the antenna port set number (the number for identifying an antenna port set) is the same. Transmission of a signal by applying a different uplink transmit beam may also mean transmission of a signal through a different antenna port or a different antenna port set including multiple antenna ports. A beam index may be an OFDM symbol number, an antenna port number, or an antenna port set number.

A complex modulation symbol for one or more layers generated by layer mapping is input into transform precoding. The transform precoding may be processing for dividing a block of complex-valued symbols into sets for each layer corresponding to one OFDM symbol. In a case where the OFDM is used, processing of Discrete Fourier Transform (DFT) in the transform precoding may not be necessary. In the precoding, the block of vectors obtained from a transform precoder may be input to generate a block of vectors to be mapped to a resource element. In a case of spatial multiplexing, one of precoding matrices may be adapted in generating the block of vectors to be mapped to a resource element. This processing may be referred to as digital beamforming. The precoding may be defined to include analog beamforming and digital beamforming, or may be defined as digital beamforming. The beamforming may be applied to a precoded signal, and the precoding may be applied to a signal to which the beamforming is applied. The beamforming may include analog beamforming and may not include digital beamforming, or may include both digital beamforming and analog beamforming. A beamformed signal, a precoded signal, or a beamformed and precoded signal may be referred to as a beam. A beam index may be a precoding matrix index. The beam index and the precoding matrix index may be defined independently. The precoding matrix indicated by the precoding matrix index may be applied to the beam indicated by the beam index to generate a signal. The beamforming indicated by the beam index may be applied to the signal to which the precoding matrix indicated by the precoding matrix index is applied, to generate a signal. The digital beamforming may include adaptation of a different precoding matrix to a resource in a frequency direction (for example, a set of subcarriers).

Note that, in the present embodiment, a radio link configured by using a prescribed transmit beam and/or a prescribed receive beam may be referred to as a beam pair link. For example, in the downlink, a beam pair link configured by using a different downlink transmit beam and/or a different downlink receive beam may be referred to as a different downlink beam pair link. For example, in the uplink, a beam pair link configured by using a different uplink transmit beam and/or a different uplink receive beam may be referred to as a different uplink beam pair link. For example, a state in which the terminal apparatus 1 can receive a downlink signal by using multiple downlink transmit beams and/or multiple downlink receive beams in a certain cell may be referred to as a state of including multiple downlink beam pair links. For example, a state in which the terminal apparatus 1 can transmit an uplink signal by using multiple uplink transmit beams and/or multiple uplink receive beams in a certain cell may be referred to as a state of including multiple uplink beam pair links.

The concept of the downlink beam pair link according to the present embodiment will be described.

Figure 6:
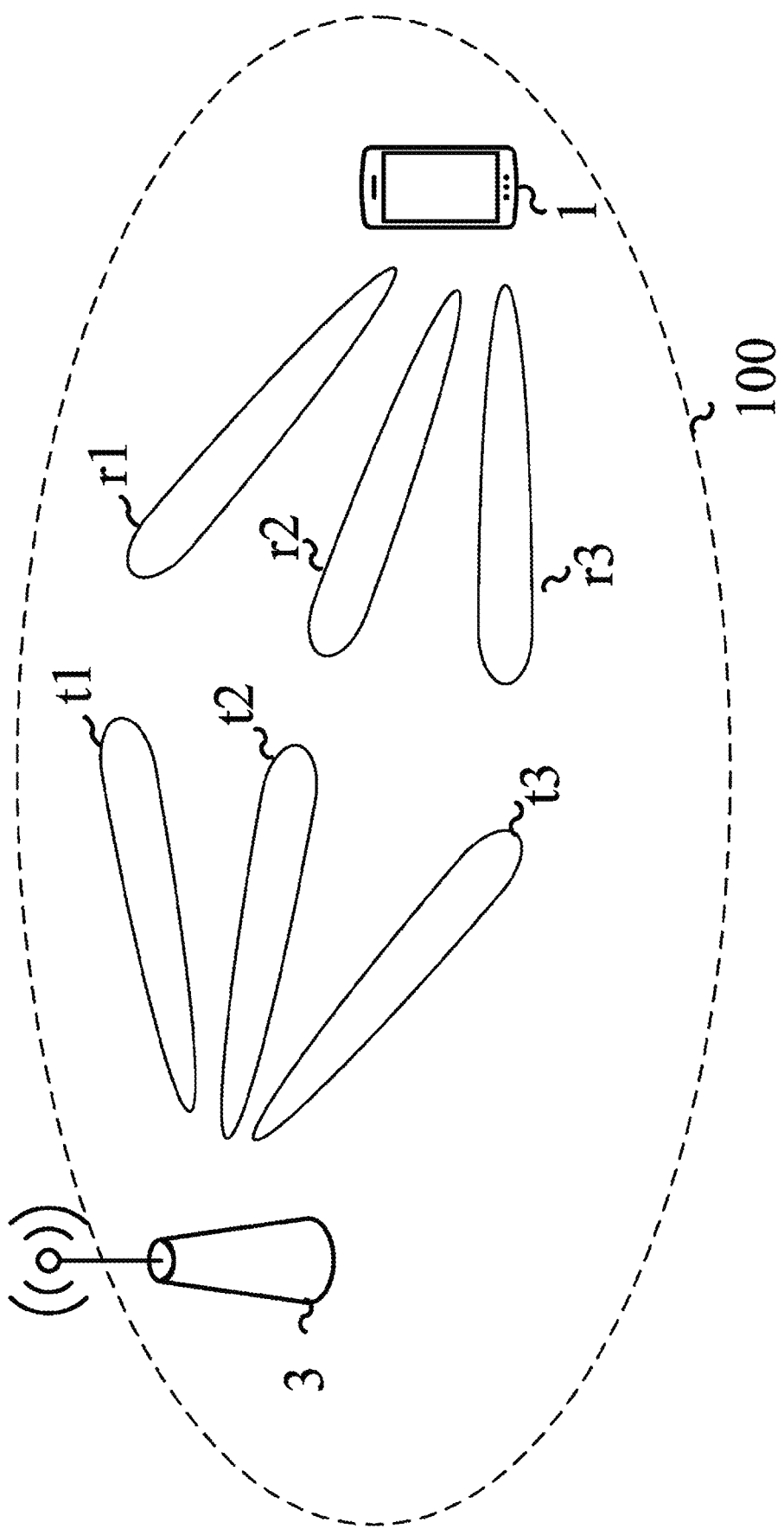
FIG. 6 is a diagram illustrating a concept that multiple reference signals to which transmit beams are applied are transmitted in one or more cells according to the embodiment of the present invention.

FIG. 6 illustrates a case where the terminal apparatus 1 and the base station apparatus 3 configure multiple downlink beam pair links in a cell 100. As a first downlink beam pair link, the terminal apparatus 1 receives a downlink signal, which is transmitted from the base station apparatus 3 by using a downlink transmit beam t1, by using a downlink receive beam r1. As a second downlink beam pair link, the terminal apparatus 1 receives a downlink signal, which is transmitted from the base station apparatus 3 by using a downlink transmit beam t2, by using a downlink receive beam r2. As a third downlink beam pair link, the terminal apparatus 1 receives a downlink signal, which is transmitted from the base station apparatus 3 by using a downlink transmit beam t3, by using a downlink receive beam r3. In this case, three downlink beam pair links are configured between the terminal apparatus 1 and the base station apparatus 3, and downlink transmission and/or reception is performed in all of or a part of the three downlink beam pair links. For example, the terminal apparatus 1 measures receive power and/or reception quality of a reference signal in each downlink beam pair link.

Note that multiple downlink beam pair links may be configured by using multiple downlink receive beams, for one downlink transmit beam. Note that multiple downlink beam pair links may be configured by using multiple downlink transmit beams, for one downlink receive beam. Note that one downlink beam pair link may be associated with one downlink transmit beam, irrespective of which downlink receive beam is used. Note that one uplink beam pair link may be associated with one uplink receive beam, irrespective of which uplink transmit beam is used.

Figure 7:
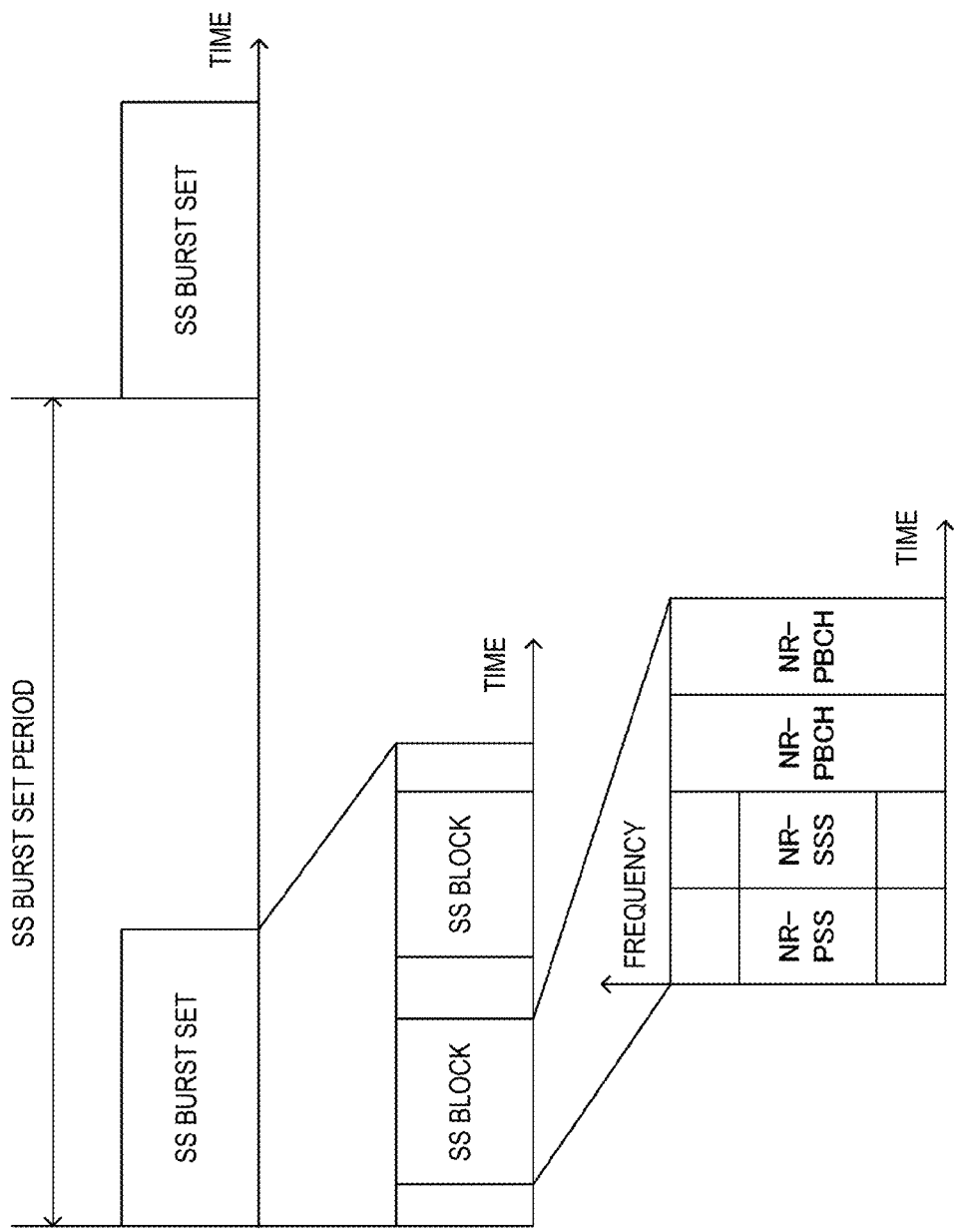
FIG. 7 is a diagram illustrating an example of a synchronization signal block and a synchronization signal burst set according to the present embodiment according to the embodiment of the present invention.

FIG. 7 is a diagram illustrating an example of a synchronization signal block (also referred to as a Synchronization Signal (SS) block) and a synchronization signal burst set (also referred to as an SS burst set) according to the present embodiment. FIG. 7 illustrates an example in which two synchronization signal blocks are included in a periodically transmitted synchronization signal burst set, and each synchronization signal block includes four OFDM symbols.

Note that one or more synchronization signal blocks may constitute a synchronization signal burst (referred to as an SS burst), and one or more synchronization signal bursts may constitute a synchronization signal burst set.

The synchronization signal block is a unit block including synchronization signals (for example, an NR-PSS and an NR-SSS) and/or NR-PBCHs. In a case where the base station apparatus 3 transmits the synchronization signals and/or the NR-PBCHs by using one or more synchronization signal blocks in the synchronization signal burst set, the base station apparatus 3 may use an independent downlink transmit beam for each synchronization signal block.

FIG. 7 illustrates an example in which the NR-PSS, the NR-SSS, and the NR-PBCHs are time-multiplexed in one synchronization signal block, and the NR-PBCHs transmitted in a bandwidth wider than a bandwidth for the NR-PSS and/or the NR-SSS are time-multiplexed in two symbols. Note that the order in which the NR-PSS, the NR-SSS and/or the NR-PBCHs are multiplexed in the time domain may be different from the example illustrated in FIG. 7. For example, in a case where the NR-PBCHs are transmitted in two symbols, an OFDM symbol for transmitting an NR-SSS may be present between the two NR-PBCH symbols.

The synchronization signal burst set may be transmitted periodically. For example, a period used for initial access and a period configured for a connected (Connected or RRC_Connected) terminal apparatus may be defined. The period configured for the connected (Connected or RRC_Connected) terminal apparatus may be configured in the RRC layer. The period configured for the connected (Connected or RRC_Connected) terminal may be a period of a radio resource in the time domain during which transmission is potentially to be performed, and in practice, whether the transmission is to be performed during the period may be determined by the base station apparatus 3. The period used for the initial access may be predefined in specifications or the like.

The synchronization signal burst set may be determined based on a System Frame Number (SFN). A starting position (boundary) of the synchronization signal burst set may be determined based on the SFN and the period.

The same downlink transmit beam may be assumed to be as applied to synchronization signal blocks having the same relative time within each synchronization signal burst set of multiple synchronization signal burst sets. Antenna ports for synchronization signal blocks having the same relative time within each synchronization signal burst set of multiple synchronization signal burst sets may be assumed to be quasi co-located (QCL) with respect to the average delay, the Doppler shift, and the spatial correlation.

For example, the number of synchronization signal blocks may be defined as the number of synchronization signal blocks within the synchronization signal burst, the synchronization signal burst set, or the period for the synchronization signal block. The number of synchronization signal blocks may indicate the number of beam groups for cell selection within the synchronization signal burst, the synchronization signal burst set, or the period for the synchronization signal block. Here, the beam group may be defined as the number of synchronization signal blocks included within the synchronization signal burst, the synchronization signal burst set, or the period for the synchronization signal block, or the number of different beams.

Notification of an SRS resource according to the present embodiment will be described.

The base station apparatus 3 transmits an SRS Resource Indicator (SRI) to the terminal apparatus 1. In this manner, the base station apparatus 3 notifies the terminal apparatus 1 of one or more resources on which the SRS is transmitted. One or more SRS resources are associated with at least one antenna port and/or one uplink transmit beam (which may be transmit spatial filter configuration or a precoder of the terminal apparatus 1). The terminal apparatus 1 that has received information of the SRI may determine an antenna port and/or an uplink transmit beam to be used for uplink transmission, based on the SRI.

A Random Access procedure according to the present embodiment will be described.

The random access procedure is classified into two procedures, i.e., a contention-based procedure and a non-Contention-based procedure.

The terminal apparatus 1 performs the contention-based random access procedure at the time of initial access from a state in which the terminal apparatus 1 is not connected (communicated) with the base station apparatus 3, and/or at the time of scheduling request in a case where transmittable uplink data or transmittable sidelink data occurs in the terminal apparatus 1 although the terminal apparatus 1 is connected with the base station apparatus 3, for example. Note that the purpose of the random access is not limited to the above purposes.

A state in which transmittable uplink data occurs in the terminal apparatus 1 may include a state in which a buffer status report corresponding to the transmittable uplink data is triggered. A state in which transmittable uplink data occurs in the terminal apparatus 1 may include a state in which a scheduling request triggered based on the occurrence of the transmittable uplink data is pended.

A state in which transmittable sidelink data occurs in the terminal apparatus 1 may include a state in which a buffer status report corresponding to the transmittable sidelink data is triggered. A state in which transmittable sidelink data occurs in the terminal apparatus 1 may include a state in which a scheduling request triggered based on the occurrence of the transmittable sidelink data is pended.

In a case where the terminal apparatus 1 receives an NR-PDCCH from the base station apparatus 3 and the NR-PDCCH includes information indicating initiation of a random access procedure, the terminal apparatus 1 may perform the non-contention-based random access procedure. Note that the information indicating initiation of a random access procedure may be referred to as an NR-PDCCH order, a PDCCH order, message 0, Msg.0, or the like. The non-contention-based random access procedure is a procedure in which a random access is performed by using a preamble corresponding to a random access preamble index indicated by an NR-PDCCH order from the base station apparatus 3. The non-contention-based random access procedure is used to promptly establish uplink synchronization between the terminal apparatus 1 and the base station apparatus 3 in a case where a handover and a transmission timing of a mobile station apparatus are not valid although the base station apparatus 3 and the terminal apparatus 1 are connected, for example. Note that the purpose of the random access is not limited to the above purposes.

Note that, in a case where the random access preamble index indicated by the NR-PDCCH order is a prescribed value, the terminal apparatus 1 may perform the contention-based random access procedure in which the terminal apparatus 1 selects one preamble from a set of available preambles at random to transmit the selected preamble.

The terminal apparatus 1 according to the present embodiment receives random access configuration information through the higher layer before initiating the random access procedure. The random access configuration information may include the following information, or information for determining/configuring the following information.

One or more time/frequency resource sets available for transmission of a random access preamble (which may also be referred to as a PRACH resource) (for example, an available PRACH resource set)

One or more random access preamble groups

One or more available random access preambles, or one or more random access preambles available in the multiple random access preamble groups Window size and Contention Resolution timer (mac-ContentionResolutionTimer) of a random access response Power ramping step Maximum number of transmissions of preamble transmission Initial transmit power of a preamble Power offset based on a preamble format Maximum number of times of power ramping Note that the random access configuration information may be associated with one synchronization signal block within a synchronization signal burst set. Note that the random access configuration information may be associated with one of one or more configured CSI-RSs. Note that the random access configuration information may be associated with one downlink transmit beam (or beam index).

Note that the terminal apparatus 1 receives one or more random access configuration information through a downlink signal, and each of the one or more random access configuration information may be associated with a synchronization signal block (which may be a CSI-RS or a downlink transmit beam). The terminal apparatus 1 may select one synchronization signal block out of the one or more received synchronization signal blocks (which may be CSI-RSs or downlink transmit beams), and may perform a random access procedure by using random access configuration information associated with the selected synchronization signal block.

FIG. 8 is a diagram illustrating an example of a configuration of the random access configuration information according to the present embodiment. In FIG. 8, the terminal apparatus 1 receives random access configuration information corresponding to a first synchronization signal block and random access configuration information corresponding to a second synchronization signal block. Each of the random access configuration information corresponding to the first synchronization signal block and the random access configuration information corresponding to the second synchronization signal block includes a preamble group, a frequency/time resource set, and other information that are available for the random access.

Note that FIG. 8 illustrates a case where the terminal apparatus 1 receives two random access configuration information corresponding to two synchronization signal blocks. However, the terminal apparatus 1 may receive three or more random access configuration information corresponding to three or more synchronization signal blocks.

Note that the example of FIG. 8 illustrates a case where each information included in the random access configuration information is present for each synchronization signal block. However, a part of information included in the random access configuration information may be configured to be shared by multiple synchronization signal blocks. For example, a part of the random access configuration information may be information configured for each synchronization signal block, CSI-RS, or downlink transmit beam (transmit filter configuration of the base station apparatus 3), and the rest of the random access configuration information may be information configured for each cell.

For example, one or more time/frequency resource sets available for transmission of a random access preamble included in the random access configuration information may be configured for each synchronization signal block, CSI-RS, and/or downlink transmit beam. The terminal apparatus 1 may select one or more time/frequency resource sets available for transmission of a random access preamble, based on the received synchronization signal block, CSI-RS, and/or downlink transmit beam.

For example, each of one or more random access preamble groups included in the random access configuration information may be associated with each synchronization signal block, CSI-RS, and/or downlink transmit beam. The terminal apparatus 1 may select a random access preamble group, based on the received synchronization signal block, CSI-RS, and/or downlink transmit beam.

Note that the example of FIG. 8 illustrates a case where one random access configuration information is associated with one synchronization signal block. However, the one random access configuration information may be associated with one index (for example, a synchronization signal block index, a CSI-RS index, or a downlink transmit beam index, for example).

Note that the terminal apparatus 1 may receive one or more downlink signals each transmitted by using one downlink transmit beam, may receive random access configuration information associated with one downlink signal out of the one or more received downlink signals, and may perform a random access procedure, based on the received random access configuration information. The terminal apparatus 1 may receive one or more synchronization signal blocks within a synchronization signal burst set, may receive random access configuration information associated with one synchronization signal block out of the one or more received synchronization signal blocks, and may perform a random access procedure, based on the received random access configuration information. The terminal apparatus 1 may receive one or more CSI-RSs, may receive random access configuration information associated with one CSI-RS out of the one or more received CSI-RSs, and may perform a random access procedure, based on the received random access configuration information.

The one or more random access configuration information may include one random access channel configuration (RACH-Config) and/or one physical random access channel configuration (PRACH-Config).

A parameter related to a random access for each downlink transmit beam may be included in the random access channel configuration.

A parameter related to a physical random access channel of each downlink transmit beam (PRACH configuration index, one or more time/frequency resources available for transmission of a random access preamble, or the like) may be included in the physical random access channel configuration.

One random access configuration information may indicate a parameter related to a random access corresponding to one downlink transmit beam, and multiple random access configuration information may indicate parameters related to multiple random accesses corresponding to multiple downlink transmit beams.

One random access configuration information may indicate a parameter related to a physical random access corresponding to one downlink transmit beam, and may indicate parameters related to multiple random accesses corresponding to multiple downlink transmit beams.

In a case where a corresponding beam is selected, random access configuration information corresponding to the beam (random access channel configuration corresponding to the beam, or physical random access channel configuration corresponding to the beam) may be selected.

Note that terminal apparatus 1 may receive one or more random access configuration information from a base station apparatus 3 and/or a transmission reception point 4 different from a base station apparatus 3 and/or a transmission reception point 4 that transmits a random access preamble. For example, based on at least one random access configuration information received from a first base station apparatus 3, the terminal apparatus 1 may transmit a random access preamble to a second base station apparatus 3.

Note that the base station apparatus 3 may receive a random access preamble transmitted by a terminal apparatus 1, and may thereby determine a downlink transmit beam to be used in a case that the base station apparatus 3 transmits a downlink signal to the terminal apparatus 1. The terminal apparatus 1 may transmit a random access preamble by using a time/frequency resource indicated by random access configuration information associated with a certain downlink transmit beam. Based on the random access preamble received from the terminal apparatus 1 and/or the time/frequency resource in which the random access preamble is received, the base station apparatus 3 may determine a downlink transmit beam to be used in a case that the base station apparatus 3 transmits a downlink signal to the terminal apparatus 1.

The following will describe a selection rule of a case where the terminal apparatus 1 according to the present embodiment receives multiple random access configuration information, and selects one random access configuration information to be used for a random access procedure from the multiple random access configuration information.

The terminal apparatus 1 may select random access configuration information to be used for a random access procedure, based on channel characteristics between the terminal apparatus 1 and the base station apparatus 3. The terminal apparatus 1 may select random access configuration information to be used for a random access procedure, based on channel characteristics measured by using a synchronization signal block or a downlink reference signal received from the base station apparatus 3.

The terminal apparatus 1 may select one random access configuration information at random from multiple received random access configuration information.

The terminal apparatus 1 may select one random access configuration information from multiple received random access configuration information, based on a downlink signal received from the base station apparatus 3. Note that the downlink signal may be a downlink signal received from a base station apparatus 3 being a transmission destination of a random access preamble, or may be a downlink signal received from a different base station apparatus 3. For example, random access configuration information selected based on a downlink signal from a first base station apparatus 3 that forms a first cell may be used for a random access procedure with a second base station apparatus 3 that forms a second cell.

As one or more available frequency/time resources included in the random access configuration information, a subcarrier index, a resource block index, a subframe number, a system frame number, a symbol number, and/or a preamble format, in each of which a random access preamble can be transmitted, may be configured.

Figure 9:
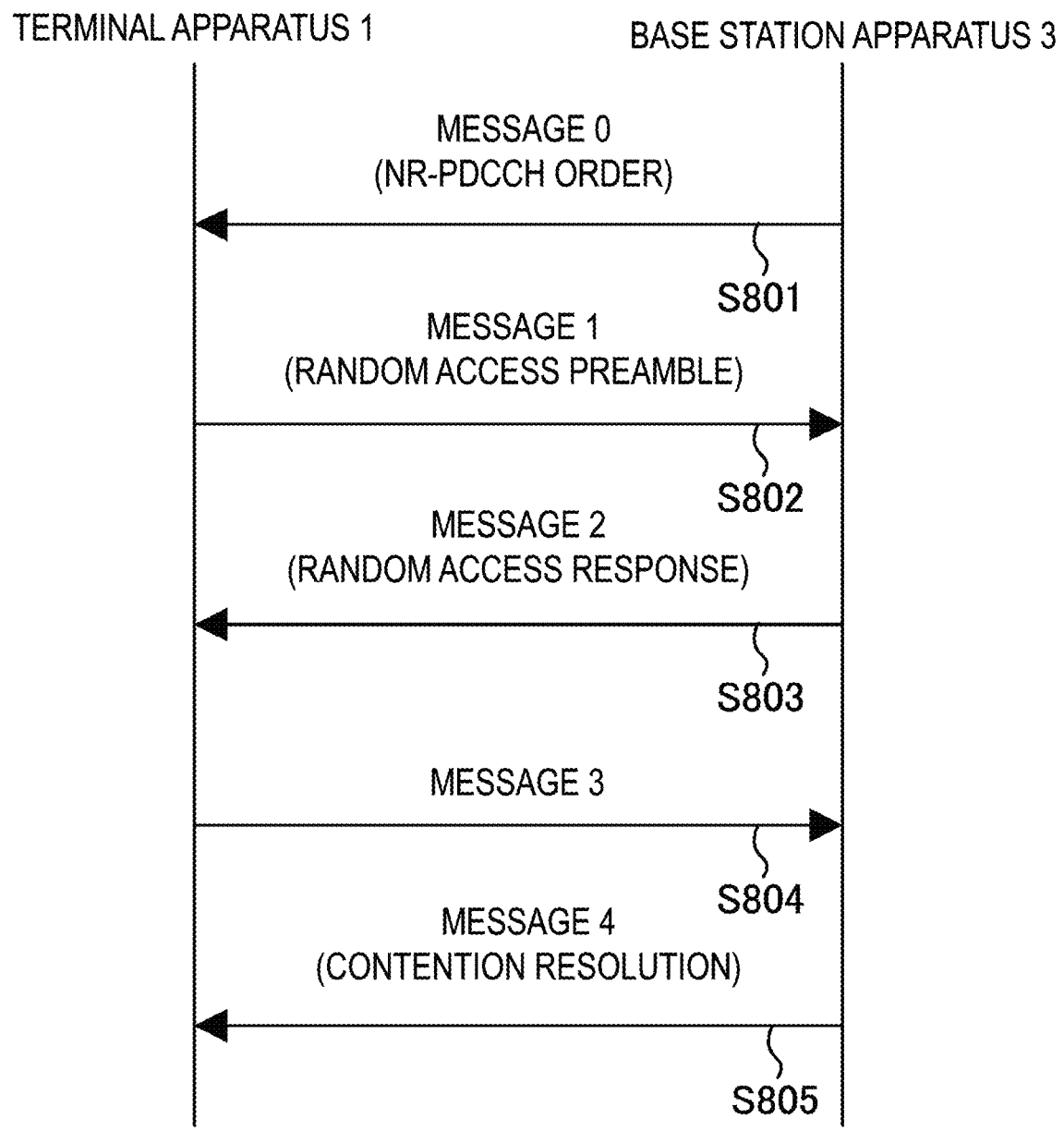
FIG. 9 is a conceptual diagram of transmission and/or reception of multiple messages between a terminal apparatus 1 and a base station apparatus 3 in a random access procedure according to the embodiment of the present invention.

A random access procedure of a case where the terminal apparatus 1 receives an NR-PDCCH order from the base station apparatus 3 is, as illustrated in FIG. 9, achieved by transmission and/or reception of multiple messages between the terminal apparatus 1 and the base station apparatus 3.

Message 0 (S801)

The base station apparatus 3 transmits an NR-PDCCH order to the terminal apparatus 1 on an NR-PDCCH, and indicates the terminal apparatus 1 to perform a random access procedure.

Information indicated by the NR-PDCCH order may include preamble index information, mask index information, SRS Resource Indicator (SRI) information, synchronization signal block re-selection indication information (SS block Re-selection Indicator), random access configuration re-selection indication information (Random Access Configuration Re-selection Indicator), and/or CSI-RS selection indication information.

The preamble index information is information indicating one or more preamble indexes out of preamble indexes of available random access preamble indexes indicated by the random access configuration information. Note that, in a case where the preamble index information is a prescribed value, the terminal apparatus 1 may select one random access preamble from one or more available random access preambles at random.

The mask index information is information indicating an index of a PRACH resource available for transmission of a random access preamble in the time domain and/or the frequency domain. Note that a time resource and/or a frequency resource indicated by the mask index information may be one specific resource or may indicate selectable multiple resources, or different indexes may separately indicate one specific resource and selectable multiple resources.

Note that the preamble index information and the mask index information may be indicated by one index information. For example, one index may indicate all of or a part of a preamble (which may be referred to as a sequence or a code), a time resource, and a frequency resource available for transmission of a random access preamble by the terminal apparatus 1.

Note that, in the preamble index information and/or the mask index information, a different value may be configured for each synchronization signal block. For example, the terminal apparatus 1 may select one synchronization signal block out of one or more received synchronization signal blocks, and may transmit a random access preamble by using preamble index information and/or mask index information associated with the selected synchronization signal block.

Note that, in the preamble index information and/or the mask index information, a common value may be configured for multiple synchronization signal blocks. For example, the terminal apparatus 1 may select one synchronization signal block out of one or more received synchronization signal blocks, may select random access configuration associated with the selected synchronization signal block, and may transmit a random access preamble corresponding to the received preamble index information and/or mask index information to an available preamble and/or time/frequency resource.

The SRI information is information for notifying of at least a part of index(es) of one or more SRS transmission resources configured by the base station apparatus 3. Note that the SRI information may be bitmap information corresponding to one or more SRS transmission resources configured by the base station apparatus 3.

The terminal apparatus 1 may determine an antenna port for transmitting a random access preamble, based on received SRI information. Note that, in a case where the SRI information indicates multiple SRS transmission resources, the terminal apparatus 1 may transmit a random access preamble in each of multiple antenna ports based on the multiple SRS transmission resources. Note that the terminal apparatus 1 may consider that an antenna port associated with an SRS transmission resource indicated by the SRI information is an antenna port available for transmission and retransmission of a random access preamble. The terminal apparatus 1 may transmit a random access preamble on an uplink transmit beam (transmit spatial filter configuration) associated with the SRS transmission resource indicated by the SRI information. Note that an antenna port used by the terminal apparatus 1 that has received the SRI information through the NR-PDCCH order for transmission of a random access preamble may be QCL with an antenna port associated with the SRS transmission resource indicated by the SRI information.

The synchronization signal block re-selection indication information is information indicating whether or not to re-select a synchronization signal block used to perform a random access procedure, for the terminal apparatus 1 that has received the NR-PDCCH order.

In a case where the synchronization signal block re-selection indication information is indicated by the NR-PDCCH order, the terminal apparatus 1 may monitor one or more synchronization signal blocks within a synchronization signal burst set, and may transmit a random access preamble by using random access configuration associated with the selected one synchronization signal block.

Note that information indicated by the synchronization signal block re-selection indication information may be other information indicated by the NR-PDCCH order. For example, the information indicated by the synchronization signal block re-selection indication information may be included in the preamble index information. In a case where a preamble index indicated by the NR-PDCCH order is a prescribed value, the terminal apparatus 1 may re-select a synchronization signal block.

The random access configuration re-selection indication information is information indicating whether or not to re-select random access configuration information used to perform a random access procedure, for the terminal apparatus 1 that has received the NR-PDCCH order. The terminal apparatus 1 that has received the random access configuration re-selection indication information through the NR-PDCCH order may select one random access configuration information out of one or more random access configuration information received in a downlink signal, and may perform transmission of a random access preamble, based on the selected random access configuration information.

Note that information indicated by the random access configuration re-selection indication information may be indicated by other information indicated by the NR-PDCCH order. For example, information indicated by the random access configuration re-selection indication information may be included in the preamble index information. In a case where a preamble index indicated by the NR-PDCCH order is a prescribed value, the terminal apparatus 1 may re-select random access configuration information.

The CSI-RS selection indication information is information indicating selection of one CSI-RS used to perform a random access procedure out of one or more configured CSI-RSs, for the terminal apparatus 1 that has received the NR-PDCCH order. The CSI-RS selection indication information may be information indicating at least a part of one or more CSI-RSs configured by the base station apparatus 3 for the terminal apparatus 1.

In a case where the CSI-RS selection indication information is indicated by the NR-PDCCH order, the terminal apparatus 1 may monitor one or more configured CSI-RSs, and may transmit a random access preamble by using random access configuration associated with the selected one CSI-RS.

Note that information indicated by the CSI-RS selection indication information may be other information indicated by the NR-PDCCH order. For example, the information indicated by the CSI-RS selection indication information may be included in the preamble index information. In a case where a preamble index indicated by the NR-PDCCH order is a prescribed value, the terminal apparatus 1 may monitor one or more configured CSI-RSs, and may transmit a random access preamble by using random access configuration associated with the selected one CSI-RS.

Note that one common index information may be used for the preamble index information, the SRI information, the synchronization signal block re-selection indication information, the random access configuration re-selection indication information, and/or the CSI-RS selection indication information. For example, random access configuration information may be re-selected in a case where the common index information is a first value, and one or more CSI-RSs may be monitored in a case where the common index information is a second value.

Message 1 (S802)

The terminal apparatus 1 that has received the NR-PDCCH order transmits a preamble for a random access to the base station apparatus 3 on a Physical Random Access Channel (PRACH). This transmitted preamble may be referred to as a random access preamble, message 1, or Msg 1. The random access preamble is configured to notify the base station apparatus 3 of information with multiple sequences. For example, in a case where 64 types of sequences are available, 6-bit information can be provided to the base station apparatus 3. The information is provided as a Random Access Preamble Identifier. A preamble sequence is selected from a preamble sequence set using a preamble index.

Note that the terminal apparatus 1 transmits a random access preamble that is indicated in a case where the NR-PDCCH order indicates a preamble index indicating one random access preamble. Note that, in a case where a preamble index indicating a prescribed value is indicated by the NR-PDCCH order, the terminal apparatus 1 may select one random access preamble from available random access preambles at random.

Note that, in a case where a mask index is indicated by the NR-PDCCH order, the terminal apparatus 1 transmits a random access preamble by using a frequency resource and/or a time resource corresponding to the indicated mask index.

Note that, in a case where SRI configuration information is indicated by the NR-PDCCH order, the terminal apparatus 1 transmits one or more random access preambles by using an antenna port and/or an uplink transmit beam corresponding to one or more SRS transmission resources indicated by the SRI configuration information.

Message 2 (S803)

The base station apparatus 3 that has received a random access preamble generates a random access response including an uplink grant for indicating the terminal apparatus 1 to perform transmission, and transmits the generated random access response to the terminal apparatus 1 on a downlink PSCH. The random access response may be referred to as message 2 or Msg 2. Based on the received random access preamble, the base station apparatus 3 calculates a transmission timing difference between the terminal apparatus 1 and the base station apparatus 3, and then includes transmission timing adjustment information (Timing Advance Command) for adjusting the difference in message 2. The base station apparatus 3 includes a random access preamble identifier corresponding to the received random access preamble in message 2. The base station apparatus 3 transmits a Random Access-Radio Network Temporary Identity ((RA-RNTI): random access response identification information) for indicating a random access response addressed to the terminal apparatus 1 that has transmitted a random access preamble, on the downlink PCCH. The RA-RNTI is determined according to frequency and time location information of a physical random access channel on which the random access preamble is transmitted. Here, in message 2 (downlink PSCH), an index of an uplink transmit beam that has been used to transmit the random access preamble may be included. Information for determining an uplink transmit beam that is to be used to transmit message 3 may be transmitted by using the downlink PCCH and/or message 2 (downlink PSCH). Here, the information for determining an uplink transmit beam that is to be used to transmit message 3 may include information indicating a difference (adjustment or correction) from a precoding index that has been used to transmit the random access preamble.

Message 3 (S804)

The terminal apparatus 1 that has transmitted a random access preamble monitors a downlink PCCH for the random access response identified by an RA-RNTI, within multiple subframe periods (referred to as RA response windows) after the transmission of the random access preamble. In a case where the terminal apparatus 1 that has transmitted a random access preamble detects a relevant RA-RNTI, the terminal apparatus 1 decodes the random access response mapped to the downlink PSCH. The terminal apparatus 1 that has successfully decoded the random access response confirms whether or not a random access preamble identifier corresponding to the transmitted random access preamble is included in the random access response. In a case where the random access preamble identifier is included, synchronization difference is corrected by using transmission timing adjustment information indicated by the random access response. The terminal apparatus 1 transmits data stored in a buffer to the base station apparatus 3 by using an uplink grant included in the received random access response. In this case, the data transmitted by using an uplink grant is referred to as message 3 or Msg 3.

In a case where the successfully decoded random access response is the first random access response successfully received in a series of random access procedures, the terminal apparatus 1 includes information (C-RNTI) for identifying the terminal apparatus 1 in message 3 to be transmitted, and transmits message 3 to the base station apparatus 3.

Message 4 (S805)

In a case where the base station apparatus 3 receives uplink transmission on a resource allocated for message 3 of the terminal apparatus 1 in the random access response, the base station apparatus 3 detects a C-RNTI MAC CE included in received message 3. In a case where the base station apparatus 3 establishes connection with the terminal apparatus 1, the base station apparatus 3 transmits a PCCH to the detected C-RNTI. In a case where the base station apparatus 3 transmits a PCCH to the detected C-RNTI, the base station apparatus 3 includes an uplink grant in the PCCH. Such PCCHs transmitted by the base station apparatus 3 are referred to as message 4, Msg 4, or a contention resolution message.

The terminal apparatus 1 that has transmitted message 3 starts a contention resolution timer that defines a period for monitoring message 4 from the base station apparatus 3, and attempts to receive a downlink PCCH transmitted from the base station within the timer. In a case where the terminal apparatus 1 that has transmitted a C-RNTI MAC CE in message 3 receives a PCCH addressed to the transmitted C-RNTI from the base station apparatus 3, and an uplink grant for new transmission is included in the PCCH, the terminal apparatus 1 considers that contention resolution with another terminal apparatus 1 has succeeded, stops the contention resolution timer, and ends the random access procedure. In a case where the terminal apparatus 1 cannot confirm, within the timer period, that the terminal apparatus 1 received a PCCH addressed to the C-RNTI that the terminal apparatus 1 itself transmitted in message 3, the terminal apparatus 1 considers that contention resolution did not succeed, transmits a random access preamble again, and continues the random access procedure. Note that, in a case where contention resolution does not succeed after a prescribed number of times of repeated transmission of a random access preamble, the terminal apparatus 1 considers that the random access has a problem, and indicates a random access problem to the higher layer. For example, the higher layer may reset a MAC entity, based on the random access problem. In a case where a reset of a MAC entity is requested by the higher layer, the terminal apparatus 1 stops the random access procedure.

Through transmission and/or reception of the above five messages, the terminal apparatus 1 can establish synchronization with the base station apparatus 3, and can perform uplink data transmission to the base station apparatus 3.

Figure 10:
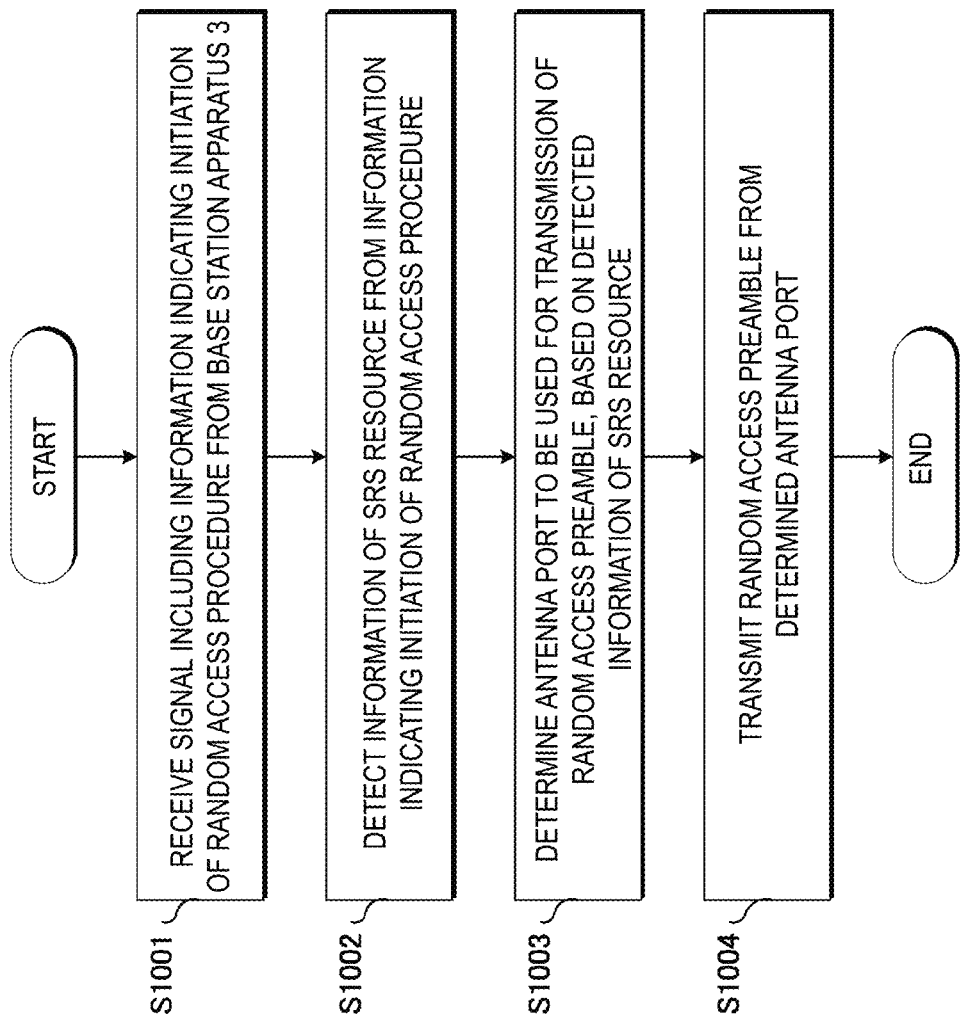
FIG. 10 is a flowchart illustrating an example of random access preamble transmission processing of the terminal apparatus 1 according to the embodiment of the present invention.

FIG. 10 is a flowchart illustrating an example of random access preamble transmission processing of the terminal apparatus 1 according to the present embodiment.

The terminal apparatus 1 receives a signal including information (NR-PDCCH order) indicating initiation of a random access procedure from the base station apparatus 3 (S1001). The terminal apparatus 1 detects information of an SRS resource (which may be SRI information, for example) from the received information indicating initiation of a random access procedure (S1002). The terminal apparatus 1 determines an antenna port to be used for transmission of a random access preamble, based on the detected information of an SRS resource (S1003). The terminal apparatus 1 transmits the random access preamble from the determined antenna port (S1004).

Figure 11:
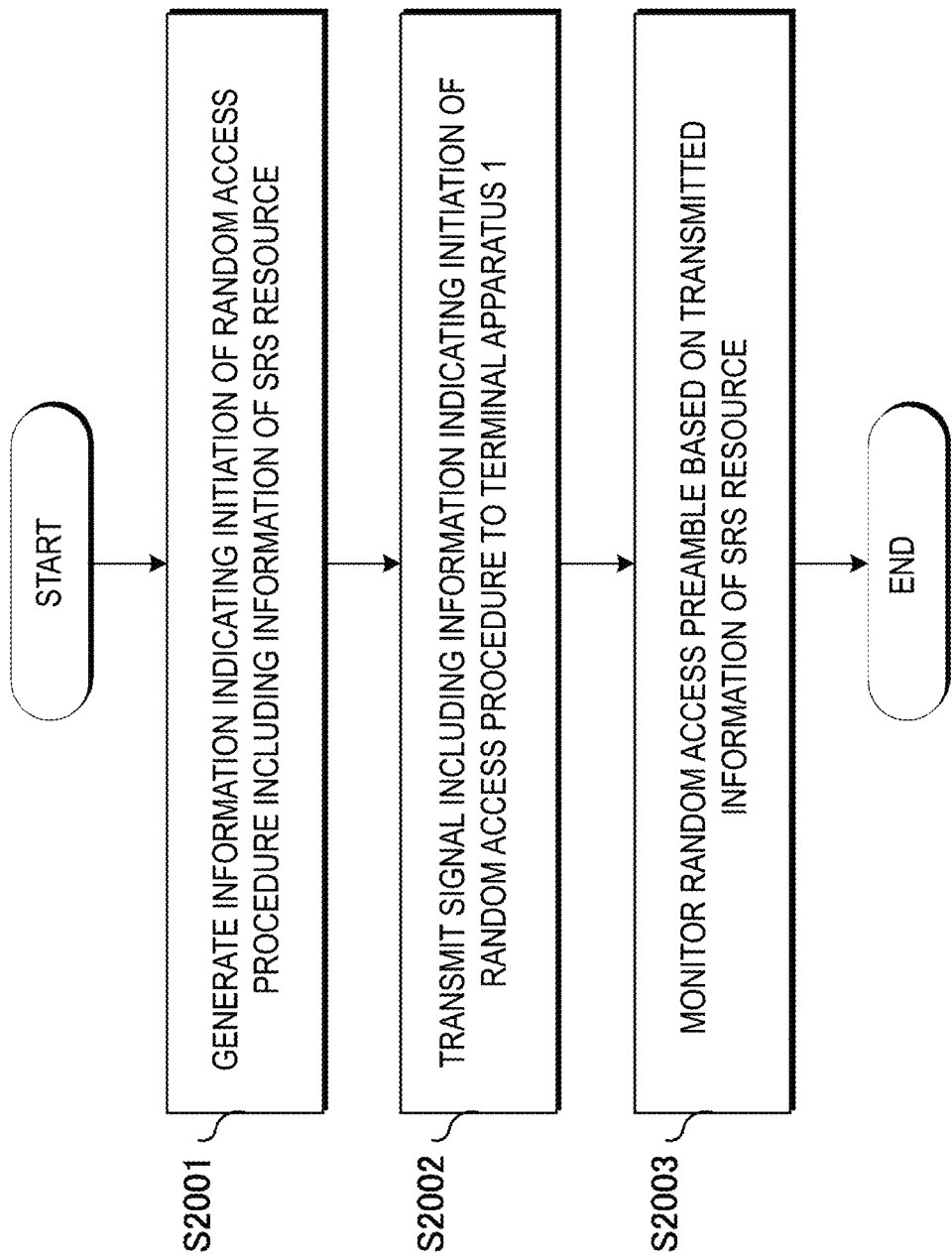
FIG. 11 is a flowchart illustrating an example of random access preamble reception processing of the base station apparatus 3 according to the embodiment of the present invention.

FIG. 11 is a flowchart illustrating an example of random access preamble reception processing of the base station apparatus 3 according to the present embodiment.

The base station apparatus 3 generates information (NR-PDCCH order) indicating initiation of a random access procedure including information of an SRS resource (which may be SRI information, for example) (S2001). The base station apparatus 3 transmits a signal including the generated information indicating initiation of a random access procedure to the terminal apparatus 1 (S2002). The base station apparatus 3 monitors a random access preamble based on the transmitted information of an SRS resource (S2003).

Figure 12:
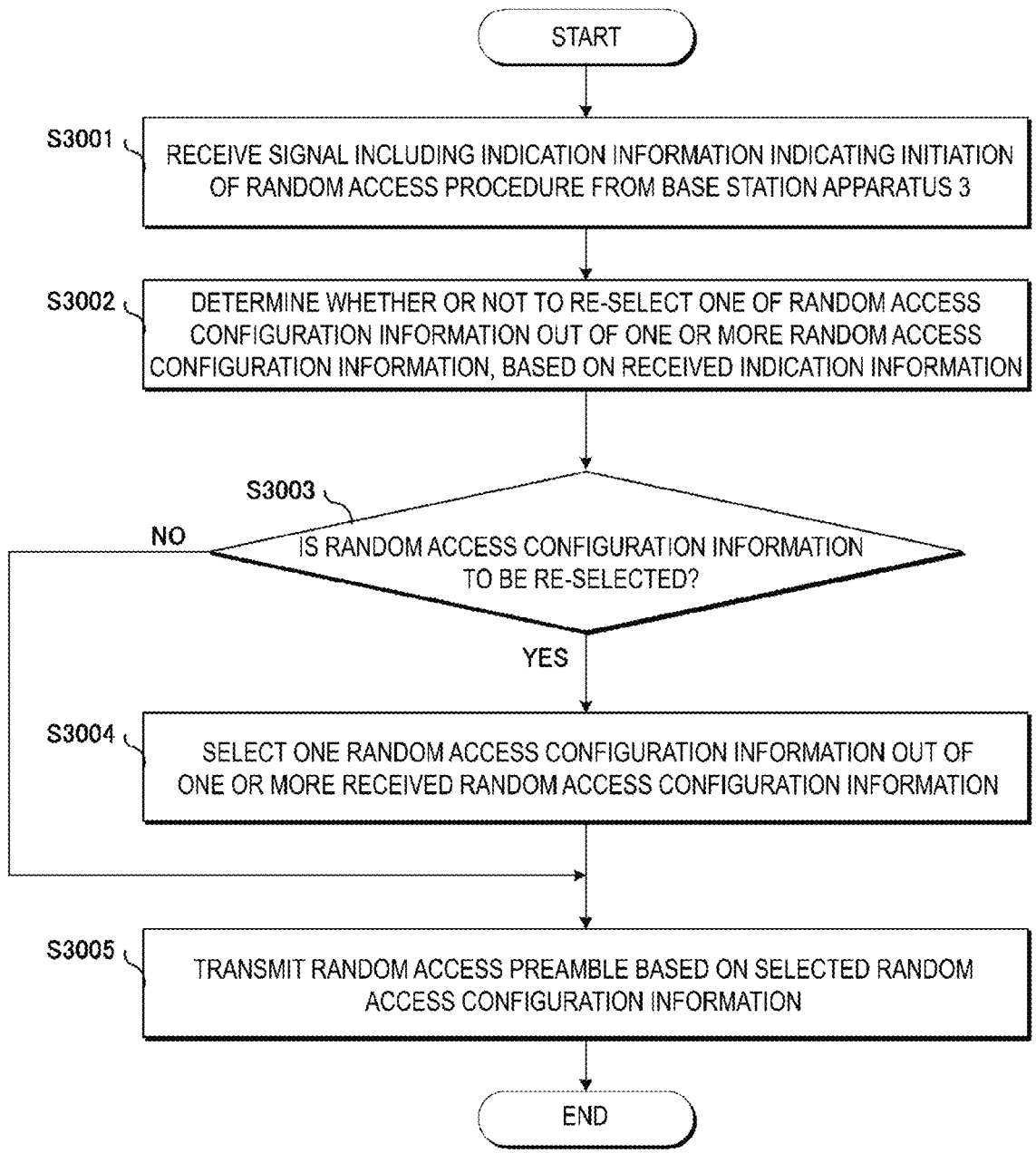
FIG. 12 is a flowchart illustrating another example of random access preamble transmission processing of the terminal station apparatus 1 according to the embodiment of the present invention.

FIG. 12 is a flowchart illustrating another example of random access preamble transmission processing of the terminal apparatus 1 according to the present embodiment.

The terminal apparatus 1 receives a signal including indication information (NR-PDCCH order) indicating initiation of a random access procedure from the base station apparatus 3 (S3001). The terminal apparatus 1 determines whether one random access configuration information out of one or more random access configuration information is to be re-selected, based on the received indication information (S3002). In accordance with a determination that random access configuration information is to be re-selected (S3003—YES), the terminal apparatus 1 selects one random access configuration information out of the one or more received random access configuration information (S3004), and the processing proceeds to Step S3005. In accordance with a determination that random access configuration information (S3003—NO) is not to be re-reselected, the terminal apparatus 1 uses random access configuration information that has already been selected, and the processing proceeds to Step S3005. The terminal apparatus 1 transmits a random access preamble, based on the selected random access configuration information (S3005).

Figure 13:
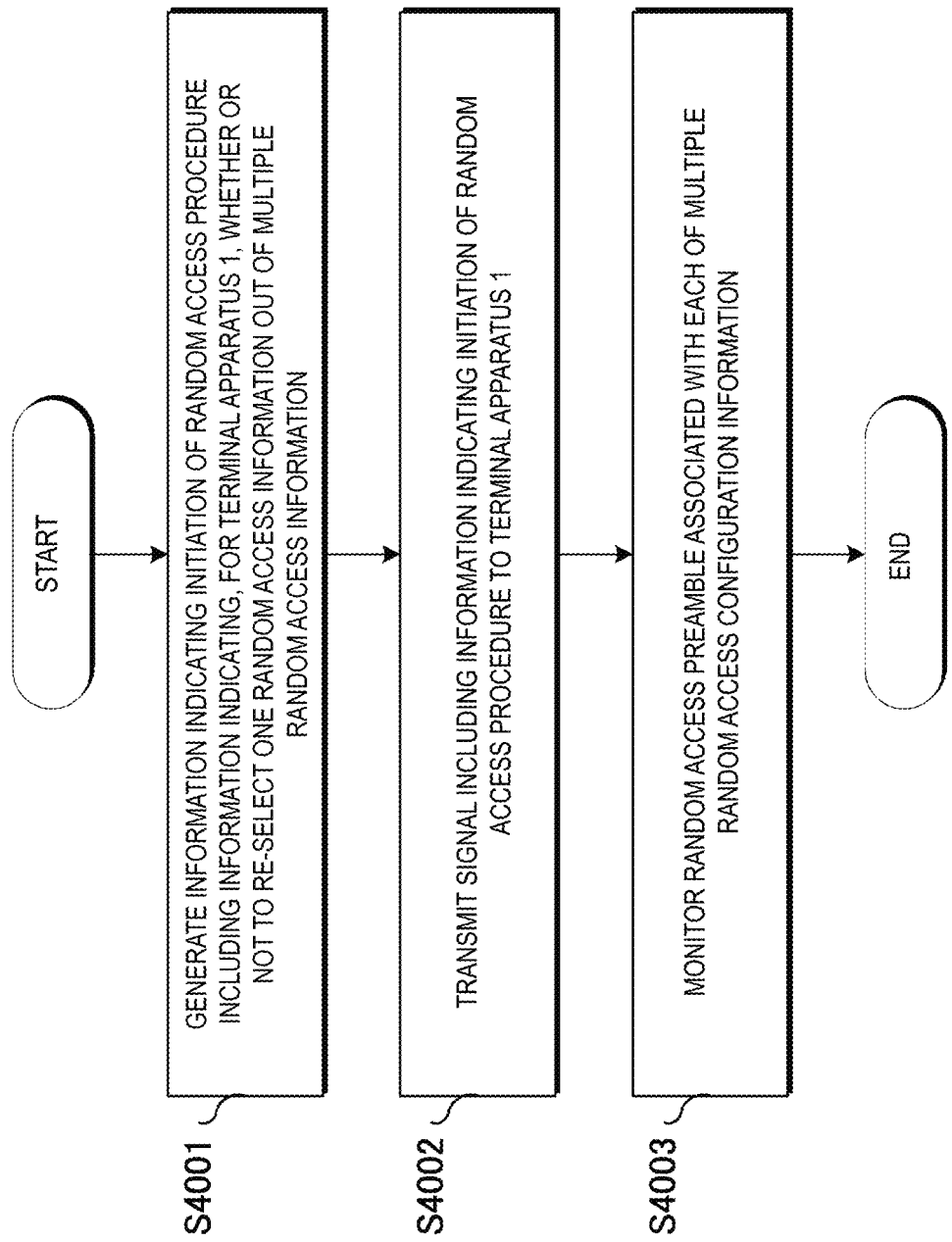
FIG. 13 is a flowchart illustrating another example of random access preamble reception processing of the base station apparatus 3 according to the embodiment of the present invention.

FIG. 13 is a flowchart illustrating another example of random access preamble reception processing of the base station apparatus 3 according to the present embodiment.

The base station apparatus 3 generates information (NR-PDCCH order) indicating initiation of a random access procedure including information indicating, for the terminal apparatus 1, whether or not to re-select one random access configuration information out of multiple random access configuration information (S4001). The base station apparatus 3 transmits a signal including the generated information indicating initiation of a random access procedure to the terminal apparatus 1 (S4002). The base station apparatus 3 monitors a random access preamble associated with each of the multiple random access configuration information (S4003).

Configurations of apparatuses according to the present embodiment will be described below.

Figure 14:
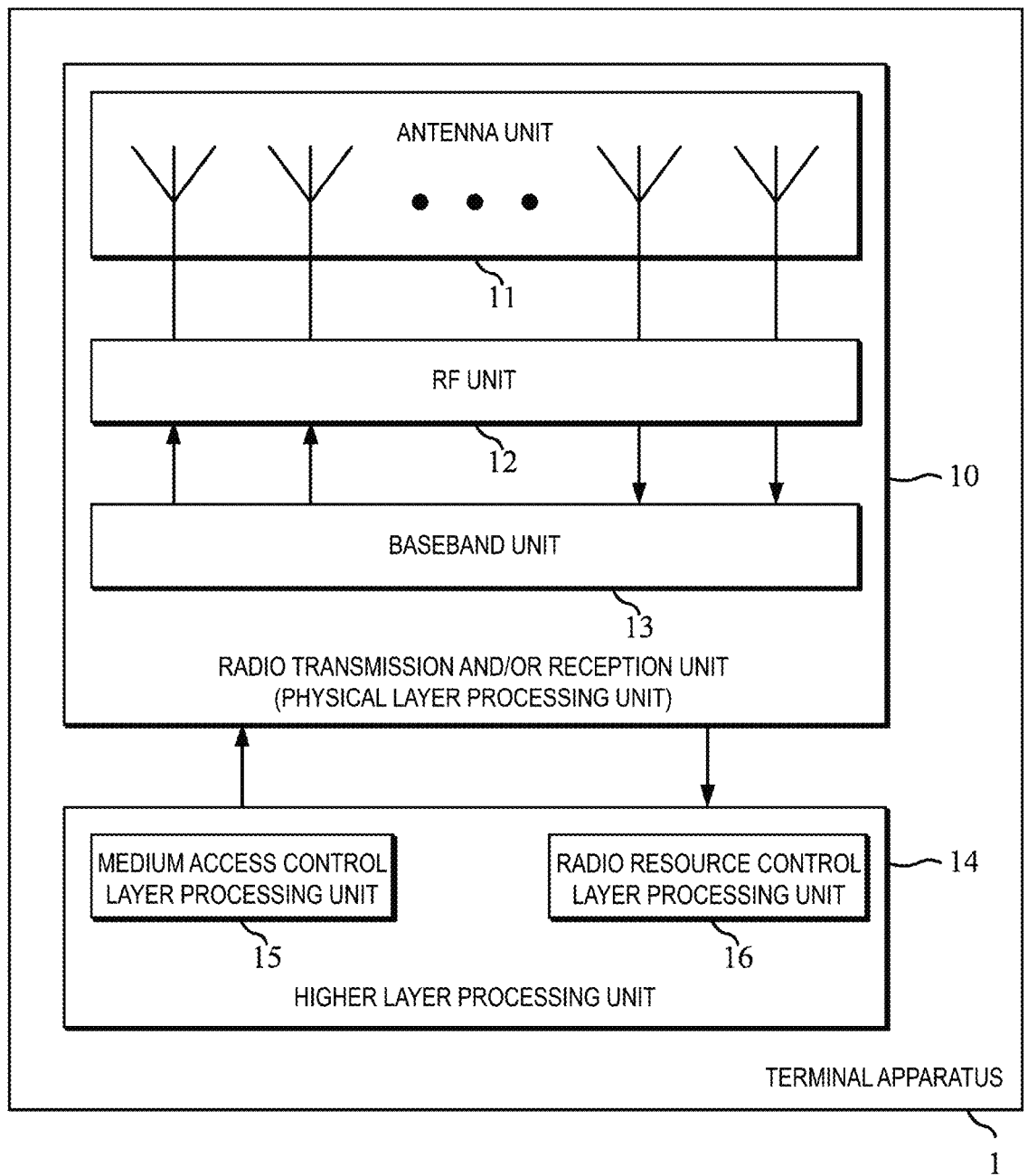
FIG. 14 is a schematic block diagram illustrating a configuration of the terminal apparatus 1 according to the embodiment of the present invention.

FIG. 14 is a schematic block diagram illustrating a configuration of the terminal apparatus 1 according to the present embodiment. As illustrated FIG. 14, the terminal apparatus 1 includes a radio transmission and/or reception unit 10 and a higher layer processing unit 14. The radio transmission and/or reception unit 10 includes an antenna unit 11, a Radio Frequency (RF) unit 12, and a baseband unit 13. The higher layer processing unit 14 includes a medium access control layer processing unit 15 and a radio resource control layer processing unit 16. The radio transmission and/or reception unit 10 is also referred to as a transmitter, a receiver, a monitor unit, or a physical layer processing unit. The higher layer processing unit 14 is also referred to as a measuring unit or a controller.

The higher layer processing unit 14 outputs uplink data (which may be referred to as a transport block) generated by a user operation or the like, to the radio transmission and/or reception unit 10. The higher layer processing unit 14 performs processing for some or all of the Medium Access Control (MAC) layer, the Packet Data Convergence Protocol (PDCP) layer, the Radio Link Control (RLC) layer, and the Radio Resource Control (RRC) layer. The higher layer processing unit 14 may have a function of determining whether or not to re-select one synchronization signal block from one or more synchronization signal blocks, based on information indicating initiation of a received random access procedure. The higher layer processing unit 14 may have a function of determining whether or not to re-select one random access configuration information from one or more random access configuration information, based on information indicating initiation of a received random access procedure.

The medium access control layer processing unit 15 included in the higher layer processing unit 14 performs processing of the medium access control layer (MAC layer). The medium access control layer processing unit 15 controls transmission of a scheduling request, based on various types of configuration information/parameters managed by the radio resource control layer processing unit 16.

The radio resource control layer processing unit 16 included in the higher layer processing unit 14 performs processing of the radio resource control layer (RRC layer). The radio resource control layer processing unit 16 manages various types of configuration information/parameters of its own apparatus. The radio resource control layer processing unit 16 sets various types of configuration information/parameters, based on higher layer signaling received from the base station apparatus 3. Namely, the radio resource control layer processing unit 16 sets various types of configuration information/parameters, based on information indicating the various types of configuration information/parameters received from the base station apparatus 3.

The radio transmission and/or reception unit 10 performs processing of the physical layer, such as modulation, demodulation, coding, and decoding. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and transmits the generated transmit signal to the base station apparatus 3. The radio transmission and/or reception unit 10 may have a function of receiving one or more synchronization signal blocks in a certain cell. The radio transmission and/or reception unit 10 may have a function of receiving a signal including indication information indicating initiation of a random access procedure from the base station apparatus 3. The radio transmission and/or reception unit 10 may have a function of receiving multiple reference signals. The radio transmission and/or reception unit 10 may have a function of determining an antenna port to be used for transmission of a random access preamble, based on information of an SRS resource received from the base station apparatus 3.

The RF unit 12 converts (down-converts) a signal received via the antenna unit 11 into a baseband signal by orthogonal demodulation, and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) on the signal from which the CP has been removed, and extracts a signal in the frequency domain.

The baseband unit 13 generates an OFDM symbol by performing Inverse Fast Fourier Transform (IFFT) on the data, adds CP to the generated OFDM symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. The RF unit 12 amplifies power. The RF unit 12 may have a function of determining transmit power of the uplink signal and/or the uplink channel to be transmitted in a serving cell. The RF unit 12 is also referred to as a transmit power control unit.

Figure 15:
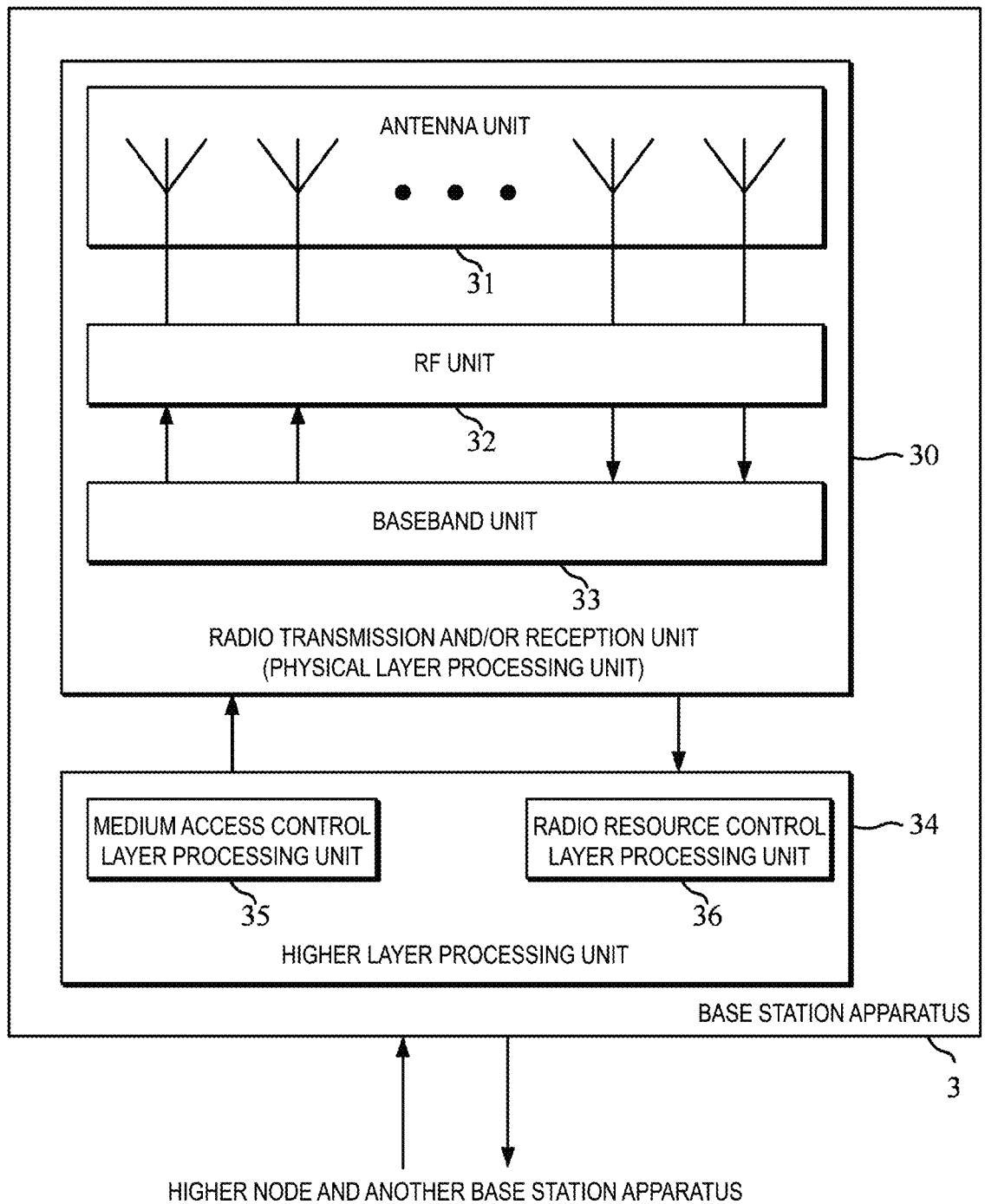
FIG. 15 is a schematic block diagram illustrating a configuration of the base station apparatus 3 according to the embodiment of the present invention.

FIG. 15 is a schematic block diagram illustrating a configuration of the base station apparatus 3 according to the present embodiment. As illustrated FIG. 15, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmitter, a receiver, or a physical layer processing unit. A controller that controls operations of each unit, based on various conditions, may be separately provided. The higher layer processing unit 34 is also referred to as a terminal control unit.

The higher layer processing unit 34 performs processing for some or all of the Medium Access Control (MAC) layer, the Packet Data Convergence Protocol (PDCP) layer, the Radio Link Control (RLC) layer, and the Radio Resource Control (RRC) layer. The higher layer processing unit 34 may have a function of generating information indicating the terminal apparatus 1 to initiate a random access procedure.

The medium access control layer processing unit 35 included in the higher layer processing unit 34 performs processing of the MAC layer. The medium access control layer processing unit 35 performs processing associated with a scheduling request, based on various types of configuration information/parameters managed by the radio resource control layer processing unit 36.

The radio resource control layer processing unit 36 included in the higher layer processing unit 34 performs processing of the RRC layer. The radio resource control layer processing unit 36 generates, or acquires from a higher node, downlink data (transport block) allocated on a physical downlink shared channel, system information, an RRC message, a MAC Control Element (CE), and the like, and outputs the generated or acquired data to the radio transmission and/or reception unit 30. The radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/broadcasts information indicating various types of configuration information/parameters. The radio resource control layer processing unit 36 may transmit/broadcast information for identifying a configuration of multiple reference signals in a certain cell.

The radio transmission and/or reception unit 30 has a function of transmitting multiple reference signals. The radio transmission and/or reception unit 30 may have a function of receiving a scheduling request transmitted from the terminal apparatus 1 by using any one of multiple scheduling request resources configured by the higher layer processing unit 34. The radio transmission and/or reception unit 30 may have a function of transmitting one or more synchronization signal blocks. The radio transmission and/or reception unit 30 may have a function of transmitting a signal including information indicating the terminal apparatus 1 to initiate a random access procedure. The radio transmission and/or reception unit 30 may have a function of receiving/monitoring a random access preamble transmitted from the terminal apparatus 1. Some of the functions of the radio transmission and/or reception unit 30 other than those described above are similar to the functions of the radio transmission and/or reception unit 10, and hence description thereof is omitted. Note that, in a case where the base station apparatus 3 is connected to one or more transmission reception points 4, some or all of the functions of the radio transmission and/or reception unit 30 may be included in each of the transmission reception points 4.

The higher layer processing unit 34 transmits (transfers) or receives control messages or user data between the base station apparatuses 3 or between a higher network apparatus (MME, Serving-GW (S-GW)) and the base station apparatus 3. In FIG. 9, other constituent elements of the base station apparatus 3, a transmission path of data (control information) between the constituent elements, and the like are omitted. However, it is apparent that the base station apparatus 3 is provided with multiple blocks, as its constituent elements, which have other functions necessary for allowing operation as the base station apparatus 3. For example, a Radio Resource Management layer processing unit and an application layer processing unit exist in the higher layer processing unit 34. The higher layer processing unit 34 may have a function of configuring multiple scheduling request resources corresponding to respective multiple reference signals transmitted from the radio transmission and/or reception unit 30.

Note that "unit" in the drawings refers to a constituent element to realize the functions and the procedures of the terminal apparatus 1 and the base station apparatus 3, which is also represented by a term such as a section, a circuit, a constituting apparatus, a device, and a unit.

Each of the units denoted by the reference signs 10 to 16 included in the terminal apparatus 1 may be configured as a circuit. Each of the units denoted by the reference signs 30 to 36 included in the base station apparatus 3 may be configured as a circuit.

Aspects of the terminal apparatus 1 and the base station apparatus 3 according to the present invention will be described below.

(1) A first aspect of the present invention is a terminal apparatus 1 including a receiver 10 configured to receive a signal including indication information (which may be an NR-PDCCH order) indicating initiation of a random access procedure from a base station apparatus 3, and a transmitter 10 configured to transmit the one or more random access preambles, based on the indication information. The transmitter 10 determines an antenna port to be used for transmission of the random access preamble, based on information of the SRS resource (which may be SRI information) included in the indication information.

(2) A second aspect of the present invention is a terminal apparatus 1 including a receiver 10 configured to receive one or more random access configuration information, a controller 14 configured to select one random access configuration information from the one or more random access configuration information, and a transmitter 10 configured to transmit a random access preamble based on any one of the one or more random access configuration information. The receiver 10 receives a signal including indication information (which may be an NR-PDCCH order) indicating initiation of a random access procedure. The controller 14 determines whether or not to re-select one random access configuration information to be used for transmission of the random access preamble from the one or more random access configuration information, based on the indication information.

(3) A third aspect of the present invention is a base station apparatus 3 including a controller 34 configured to generate indication information (which may be an NR-PDCCH order) indicating initiation of a random access procedure including information of an SRS resource (which may be SRI information), a transmitter 30 configured to transmit a signal including the indication information to a terminal apparatus 1, and a receiver 30 configured to monitor a random access preamble based on the information of the SRS resource.

(4) A fourth aspect of the present invention is a base station apparatus 3 including a controller 34 configured to generate indication information (which may be an NR-PDCCH order) indicating initiation of a random access procedure including information (which may be random access configuration information re-selection indication information) indicating, for the terminal apparatus 1, whether or not to re-select one random access configuration information out of multiple random access configuration information, a transmitter 30 configured to transmit a signal including the indication information to the terminal apparatus 1, and a receiver 30 configured to monitor a random access preamble associated with each of the multiple random access configuration information.

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiment according to the present invention may be recorded in a computer-readable recording medium. This configuration may be realized by causing a computer system to read the program recorded on the recording medium for execution. It is assumed that the "computer system" herein refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case where with advances in semiconductor technology, a circuit integration technology appears that replaces the present integrated circuits, it is also possible to use a new integrated circuit based on the technology according to one or more aspects of the present invention.

Note that the invention of the present patent application is not limited to the above-described embodiment. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses, for example.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

CROSS-REFERENCE OF RELATED APPLICATION

The present application relates to Japanese Patent Application No. 2017-117490, filed on Jun. 15, 2017, and claims priority on the basis of the application, the contents of which are incorporated by reference herein in its entirety.

REFERENCE SIGNS LIST 1 (1A, 1B) Terminal apparatus
3 Base station apparatus
4 Transmission reception point (TRP)
10 Radio transmission and/or reception unit (transmitter, receiver, monitor unit, physical layer processing unit)
11 Antenna unit
12 RF unit
13 Baseband unit
14 Higher layer processing unit
15 Medium access control layer processing unit
16 Radio resource control layer processing unit
30 Radio transmission and/or reception unit (transmitter, receiver, physical layer processing unit)
31 Antenna unit
32 RF unit
33 Baseband unit
34 Higher layer processing unit
35 Medium access control layer processing unit
36 Radio resource control layer processing unit
50 Transceiver unit (TXRU)
51 Phase shifter
52 Antenna element

The invention claimed is:

1. A terminal apparatus comprising:
a receiver configured to receive preamble index information on a physical downlink control channel; and
a transmitter configured to:
in a case where the preamble index information indicates a prescribed value, select a block from multiple blocks based on results of monitoring the multiple blocks and transmit a random access preamble based on the block selected, and
in a case where the preamble index information indicates a value other than the prescribed value, transmit the random access preamble corresponding to a preamble index indicated by the preamble index information, wherein
the block selected includes four Orthogonal Frequency Division Multiplexing (OFDM) symbols to which at least a physical broadcast channel is mapped.

2. A base station apparatus comprising:
a transmitter configured to transmit preamble index information on a physical downlink control channel; and
a receiver configured to:
in a case where the preamble index information indicates a prescribed value, receive a random access preamble based on a block selected from multiple blocks by a terminal apparatus based on results of monitoring the multiple blocks, and
in a case where the preamble index information indicates a value other than the prescribed value, receive the random access preamble corresponding to a preamble index indicated by the preamble index information, wherein
the block selected includes four Orthogonal Frequency Division Multiplexing (OFDM) symbols to which at least a physical broadcast channel is mapped.

3. A communication method used for a terminal apparatus, the communication method comprising:
receiving preamble index information on a physical downlink control channel; and
selecting, in a case where the preamble index information indicates a prescribed value, a block from multiple blocks based on results of monitoring the multiple blocks to transmit a random access preamble based on the block selected, and
transmitting, in a case where the preamble index information indicates a value other than the prescribed value, the random access preamble corresponding to a preamble index indicated by the preamble index information, wherein
the block selected includes four Orthogonal Frequency Division Multiplexing (OFDM) symbols to which at least a physical broadcast channel is mapped.

4. A communication method used for a base station apparatus, the communication method comprising:
transmitting preamble index information on a physical downlink control channel; and
receiving, in a case where the preamble index information indicates a prescribed value, a random access preamble based on a block selected from multiple blocks by a terminal apparatus based on results of monitoring the multiple blocks, and
receiving, in a case where the preamble index information indicates a value other than the prescribed value, the random access preamble corresponding to a preamble index indicated by the preamble index information, wherein
the block selected includes four Orthogonal Frequency Division Multiplexing (OFDM) symbols to which at least a physical broadcast channel is mapped.

5. An integrated circuit implemented on a terminal apparatus, the integrated circuit causing the terminal apparatus to perform:
receiving preamble index information on a physical downlink control channel;
selecting, in a case where the preamble index information indicates a prescribed value, a block from multiple blocks based on results of monitoring the multiple blocks and transmitting a random access preamble based on the block selected, and
transmitting, in a case where the preamble index information indicates a value other than the prescribed value, the random access preamble corresponding to a preamble index indicated by the preamble index information, wherein
the block selected includes four Orthogonal Frequency Division Multiplexing (OFDM) symbols to which at least a physical broadcast channel is mapped.

6. An integrated circuit implemented on a base station apparatus, the integrated circuit causing the base station apparatus to perform:
transmitting preamble index information on a physical downlink control channel;
receiving, in a case where the preamble index information indicates a prescribed value, a random access preamble based on a block selected from multiple blocks by a terminal apparatus based on results of monitoring the multiple blocks, and
receiving, in a case where the preamble index information indicates a value other than the prescribed value, the random access preamble corresponding to a preamble index indicated by the preamble index information, wherein
the block selected includes four Orthogonal Frequency Division Multiplexing (OFDM) symbols to which at least a physical broadcast channel is mapped.

* * * * *